(12) United States Patent
Aoki

(10) Patent No.: US 7,053,937 B1
(45) Date of Patent: May 30, 2006

(54) THREE-DIMENSIONAL IMAGE CAPTURING DEVICE AND RECORDING MEDIUM

(75) Inventor: Harumi Aoki, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/573,567

(22) Filed: May 19, 2000

(30) Foreign Application Priority Data

May 21, 1999 (JP) .............................. P11-141650
May 31, 1999 (JP) .............................. P11-151366

(51) Int. Cl.
H04N 5/76 (2006.01)

(52) U.S. Cl. .............................. 348/231.3; 348/231.2; 348/135

(58) Field of Classification Search ............. 348/231.2, 348/231.3, 42, 43, 46, 51, 135, 139, 141, 348/207.1, 348, 349, 362, 364, 140, 231.99, 348/231.6, 231.9; 356/3, 407; 382/154, 382/285

See application file for complete search history.

(56) References Cited

U.S. PATENT DOCUMENTS

| 5,699,280 | A  | * | 12/1997 | Oda et al. ................... 702/158 |
| 6,191,761 | B1 | * | 2/2001  | Melville et al. ............... 345/32 |
| 6,278,447 | B1 | * | 8/2001  | Anderson .................... 715/723 |
| 6,278,480 | B1 | * | 8/2001  | Kurahashi et al. ............ 348/59 |
| 6,445,814 | B1 | * | 9/2002  | Iijima et al. ................. 382/154 |
| 6,549,650 | B1 | * | 4/2003  | Ishikawa et al. ............. 382/154 |
| 6,587,183 | B1 | * | 7/2003  | Uomori et al. ............... 356/3.1 |
| 6,600,511 | B1 | * | 7/2003  | Kaneko et al. .............. 348/231.3 |
| 6,640,004 | B1 | * | 10/2003 | Katayama et al. ........... 382/154 |
| 6,674,472 | B1 | * | 1/2004  | Tsutsui .................. 348/333.05 |
| 2001/0031143 | A1 | * | 10/2001 | Kamon et al. ............... 396/121 |
| 2002/0028001 | A1 | * | 3/2002 | Doi et al. .................... 382/103 |
| 2002/0141652 | A1 | * | 10/2002 | Charrier et al. ............. 382/248 |
| 2003/0133007 | A1 | * | 7/2003 | Iijima et al. ................... 348/46 |

FOREIGN PATENT DOCUMENTS

JP          8317425          11/1996

OTHER PUBLICATIONS

"Digital Still Camera Image File Format Standard (Exchangeable image file format for Digital Still Camera: Exif) Ver. 2.1", JEIDA-49-1998; established Nov. 1995, revised Jun. 1998, Japan Electronic Industry Development Association; table of contents and pp. 34,35,46 and 47.

* cited by examiner

Primary Examiner—Ngoc-Yen Vu
Assistant Examiner—Nelson D. Hernandez
(74) Attorney, Agent, or Firm—Greenblum & Bernstein, P.L.C.

(57) ABSTRACT

A three-dimensional image capturing device is provided with a CCD which captures an image of a subject as image data and obtains the distance from the device to a point on a surface of the subject corresponding to each of the image data as distance measurement data. The device obtains the distance to the subject by emitting a light beam to the subject and performing a light emitting operation and electronic shuttering operation of the CCD in tandem. In the operations, each photo-diode in the CCD detects the electric charge signal corresponding to the distance to the subject. The distance measurement data is calculated from the electric charge signal detected by each photo-diode of the CCD. The image data and the distance measurement data are stored in a file or files created in a recording medium so as to maintain correspondence between the image data and the distance measurement data.

25 Claims, 22 Drawing Sheets

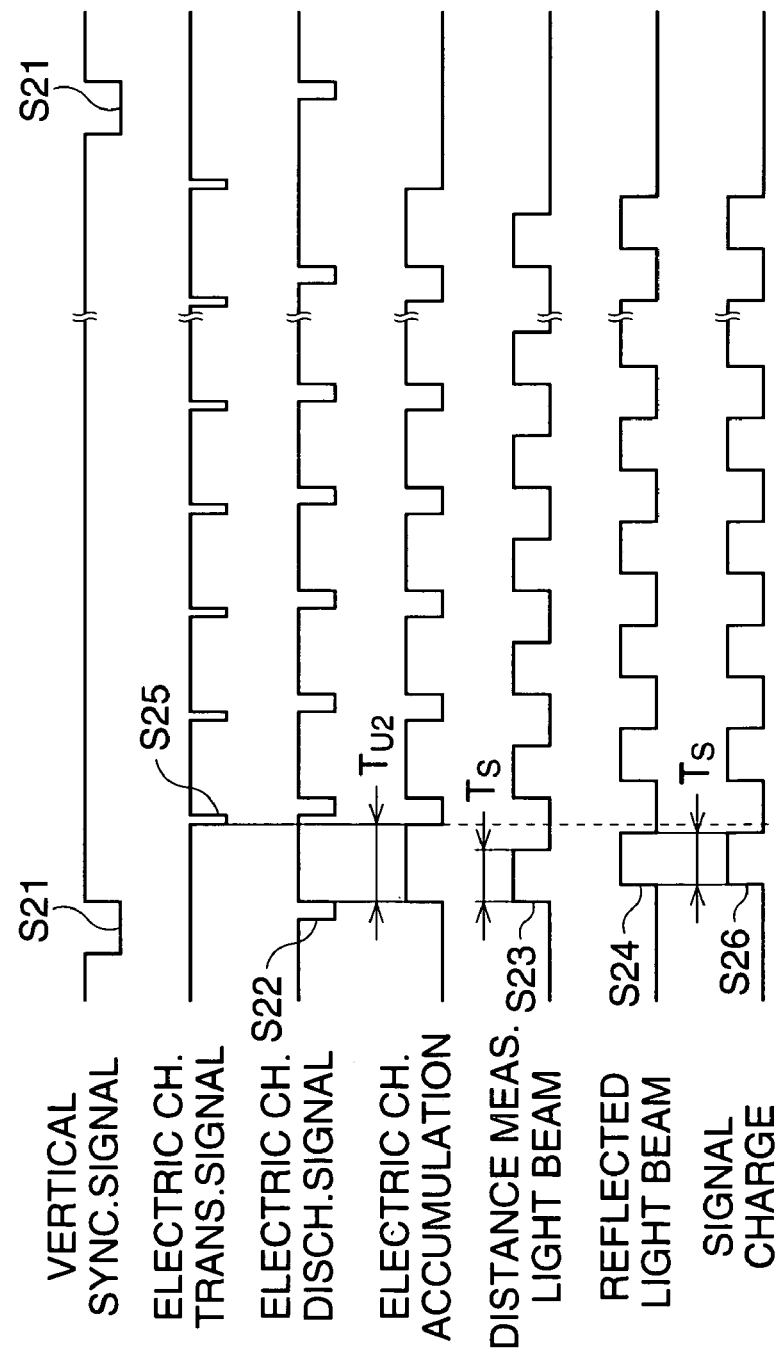

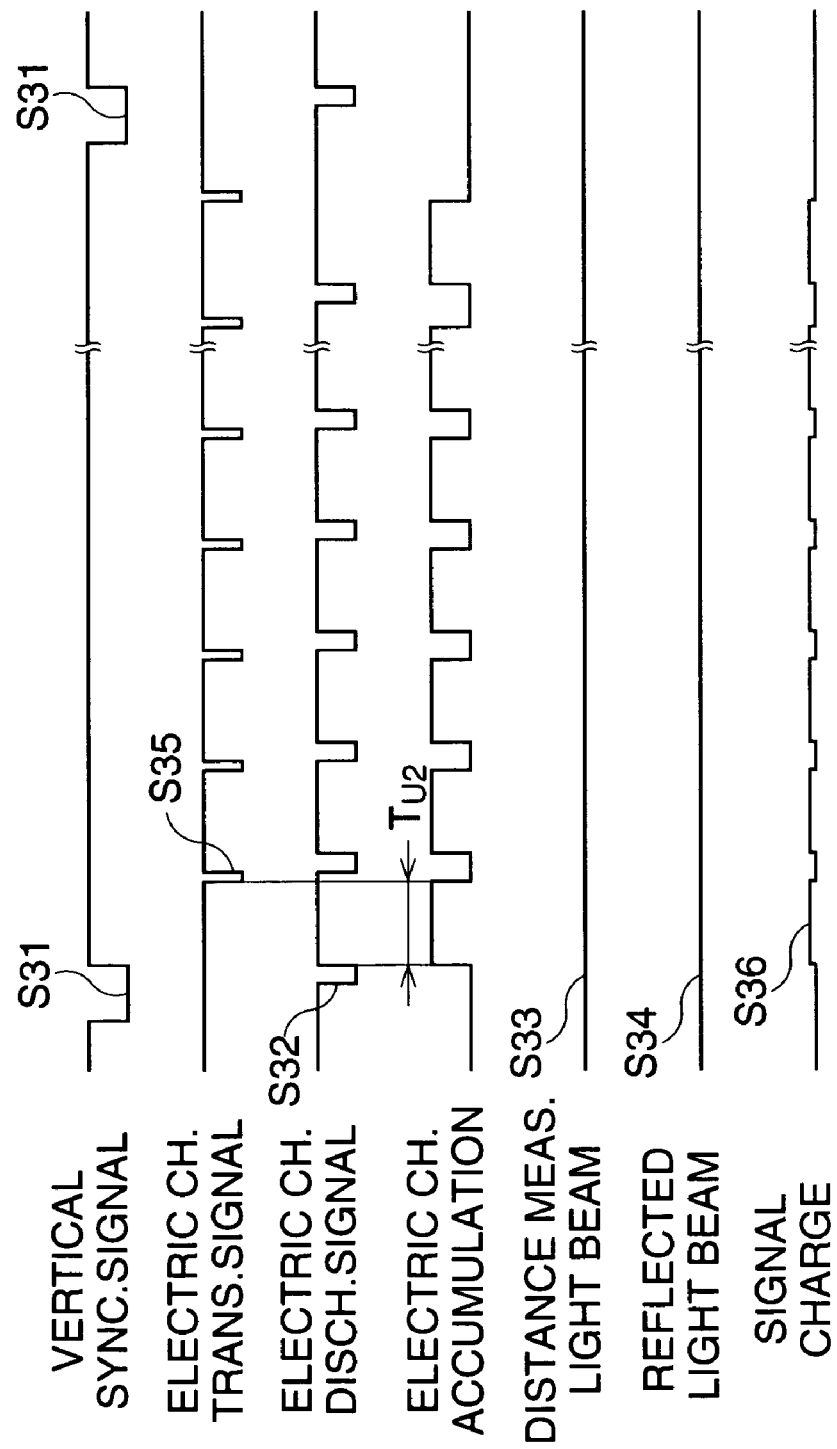

3D MODE

61

3D MODE

| $D_0$ | $D_1$ | $D_2$ | $D_3$ | |
|---|---|---|---|---|
| 123 | 101 | 134 | 98 | ... |
| 145 | 108 | 92 | 117 | ... |
| $D_n$ | $D_{n+1}$ | $D_{n+2}$ | $D_{n+3}$ | |

FIG. 17B

| $D_0$ | $d_1$ | $d_2$ | $d_3$ | |
|---|---|---|---|---|
| 123 | −22 | +33 | −36 | ... |
| +22 | −37 | −16 | +25 | ... |
| $d_n$ | $d_{n+1}$ | $d_{n+2}$ | $d_{n+3}$ | |

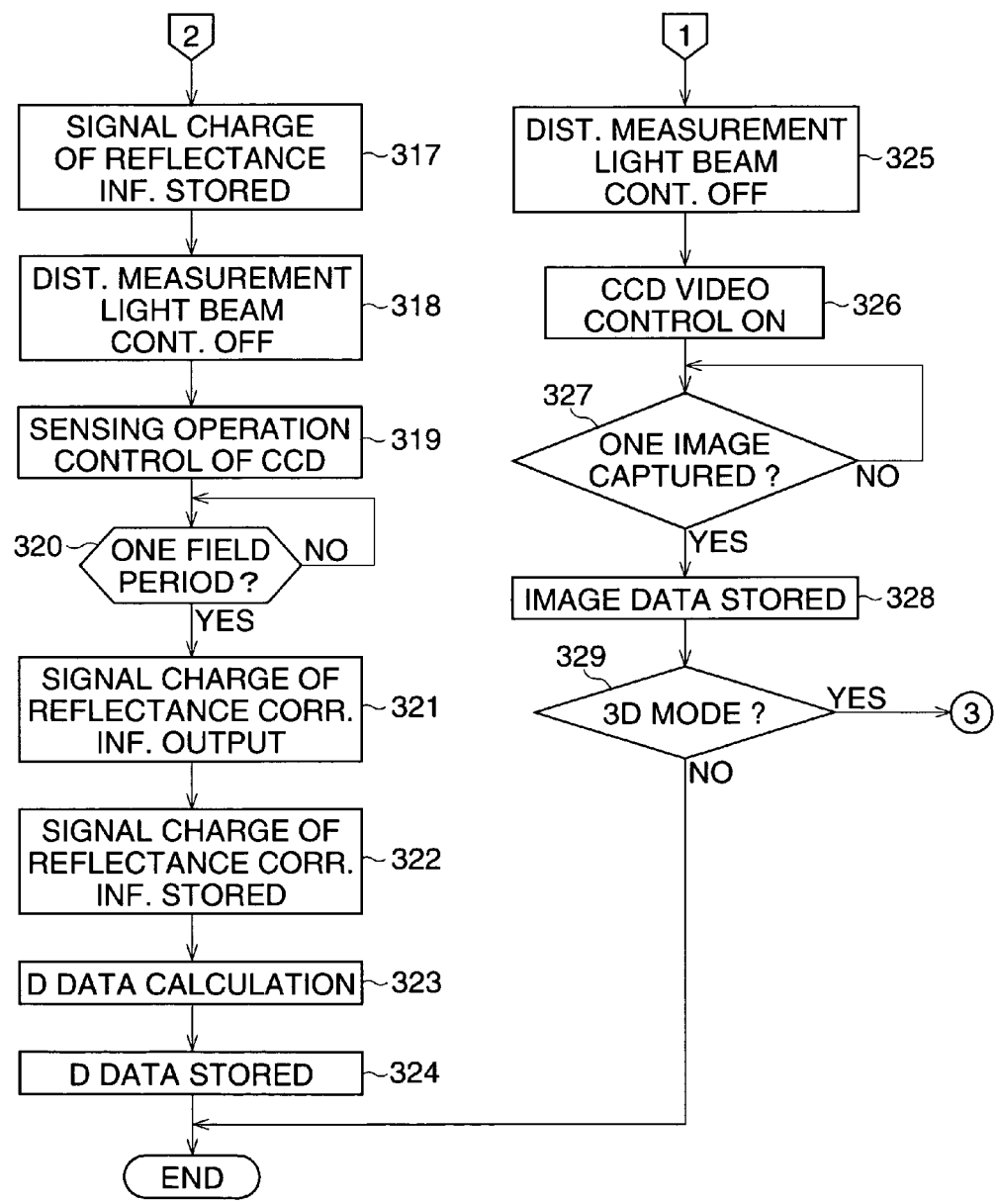

IMAGE DATA FILE

DISTANCE DATA FILE

IMAGE DATA

IMAGE DATA

THREE-DIMENSIONAL IMAGE CAPTURING DEVICE AND RECORDING MEDIUM

BACKGROUND OF THE INVENTION

1. Field of the Invention

The present invention relates to a three-dimensional image capturing device detecting information relating to a three-dimensional shape or topography and a two-dimensional image of a subject, and its recording medium.

2. Description of the Related Art

A three-dimensional measurement using a three-dimensional image capturing device of the related art may be classified into active systems radiating light, an electromagnetic wave, or a sonic wave to a subject and passive systems not emitting light etc. As active systems, time-of-flight, phase change, triangulation, moire contouring, interferometry, etc. are known. As passive systems, stereo vision, range-from-focus, and so on are known.

As a method of storing two-dimensional image information of the subject together with information of the distance to a subject obtained by one of the above three-dimensional measurement methods, there is the image format standard Exif used in digital still cameras (JEIDA standard). The distance to the subject is detected by using an auto focus mechanism etc., and the obtained distance measurement data is stored in a file management area while the two-dimensional image data (hereinafter referred to as the "image data") is stored in the data area. This format, however, only comprises a single distance measurement data related to the subject. Therefore the data stored by this format cannot be used for three-dimensional image processing based on a three-dimensional shape or topography of the subject.

Further, the apparatus disclosed in Japanese Unexamined Patent Publication (Kokai) No. 8-317425 stores pairs of image data for the left eye and for the right eye in the stereo vision method in a single recording medium. In the file management area, it also stores the link information for identifying the pairs of image data. Storing the image data by the above method, however, requires two sets of image data to be stored in order to obtain single three-dimensional image information and therefore about two times the storage space is required compared with ordinary image data. Further, in order to calculate the distance from the apparatus to a certain point on the surface of the subject corresponding to a certain pixel of the above images, the corresponding relations between pixels in the right and left eye image should be detected. However, detecting the corresponding relations between pixels in the right and left eye image is not easy, so it is difficult to obtain the distance measurement data corresponding to each of the image pixels. Consequently, it is inconvenient in the three-dimensional image processing to make direct use of distance measurement data corresponding to each of the image pixels.

SUMMARY OF THE INVENTION

An object of the present invention is to provide a three-dimensional image capturing device storing image data and distance measurement data on a recording medium in a format enabling storage of three-dimensional image information of a high precision with a small storage space and enabling easy execution of three-dimensional image processing.

According to the present invention, there is provided a three-dimensional image capturing device comprising an image capturing processor that obtains image data of a subject, a distance measurement data detecting processor that detects distances, from the device to points on a surface of the subject, corresponding to at least one of the image data to obtain distance measurement data, and a three-dimensional image data storing processor that stores the image data and the distance measurement data in a recording medium so that the image data and distance measurement data are in correspondence with each other.

In a preferred example, a three-dimensional image data storing processor stores the image data and distance measurement data in the recording medium as a single file so as to maintain the correspondence between the image data and the distance measurement data. Each of the image data has corresponding distance measurement data. Further, the image data and each of the corresponding distance measurement data are stored adjacently in the recording medium.

The file comprises a file management area for storing common information of the file and a data area for storing data. In a preferred example, the distance measurement data represents absolute distances from the device to the points in a predetermined unit of distance and the unit of distance is stored in the file management area.

The other example of distance measurement data represents relative distance in a predetermined distance range, and distance range information relating to the distance range is stored in the file management area. Further, the distance range information comprises a minimum distance and maximum distance of the distance range or the minimum distance and a range of the distance range.

Another preferred example of a three-dimensional image data storing processor stores the image data and the distance measurement data in an image data file and distance data file respectively. It also stores file link information that expresses mutual linkage information of the image data file and the distance data file so as to maintain the correspondence between the image data and the distance measurement data. The image data, the distance measurement data, and the file link information are stored in the single recording medium.

Further, the image data file comprises a first file management area for storing common information of the image data file and a first data area for storing image data. The distance data file comprises a second file management area for storing common information of the distance data file and a second data area for storing the distance measurement data. The file link information is stored in at least one of the first or second file management areas. The first file management area stores information for identifying the corresponding distance data file as the file link information, and the second file management area stores information for identifying the corresponding image data file as the file link information. Each of the file link information stored in the first and second file management area comprises common information so as to indicate the mutual linkage. Further the common information is part of a file name including a file extension.

When the distance measurement data represents absolute distances from the device to points in a predetermined unit of distance, the unit of distance is stored in the second file management area.

When the distance measurement data represents relative distances in a predetermined distance range, distance range information relating to the distance range is stored in the second file management area. For example, the distance range information comprises a minimum distance and a maximum distance of the distance range or the minimum distance and a range of the distance range.

Another preferred example of a distance measurement data represents differences from a certain distance that corresponds to a reference distance measurement data which is included in the distance measurement data. The reference distance measurement data, for example, is distance measurement data that is adjacent in a predetermined direction. When there is no adjacent distance measurement data to refer to, the distance measurement data represents an absolute distance from the device to the point or a relative data in a predetermined distance range.

Further according to the present invention, there is provided a recording medium storing image data of a subject captured by an image capturing device and distance measurement data representing distances from the image capturing device to points on a surface of the subject and corresponding to at least one of the image data in a single file. Each of the image data has the corresponding distance measurement data and the image data and each of the corresponding distance measurement data are stored adjacently in the file.

Further according to the present invention, there is provided a recording medium storing image data of a subject captured by an image capturing device in an image data file and storing distance measurement data, representing distances from the image capturing device to points on a surface of the subject corresponding to at least one of the image data, in a distance data file. It also stores file link information indicating the linkage between the image data file and the distance data file in at least one of the image data file or the distance data file and each of the image data has the corresponding distance measurement data.

BRIEF DESCRIPTION OF THE DRAWINGS

The above objects and advantages of the present invention will be better understood from the following description with reference to the accompanying drawings, in which:

FIG. 9 is a timing chart of a reflectance information sensing operation;

FIG. 10 is a timing chart of a reflectance correction information sensing operation;

FIG. 17A and FIG. 17B are views explaining differential distance measurement data in a fourth embodiment;

FIG. 19A and FIG. 19B show a flowchart of a distance information sensing operation and image information sensing operation in a sixth embodiment;

DESCRIPTION OF THE PREFERRED EMBODIMENTS

Figure 1:
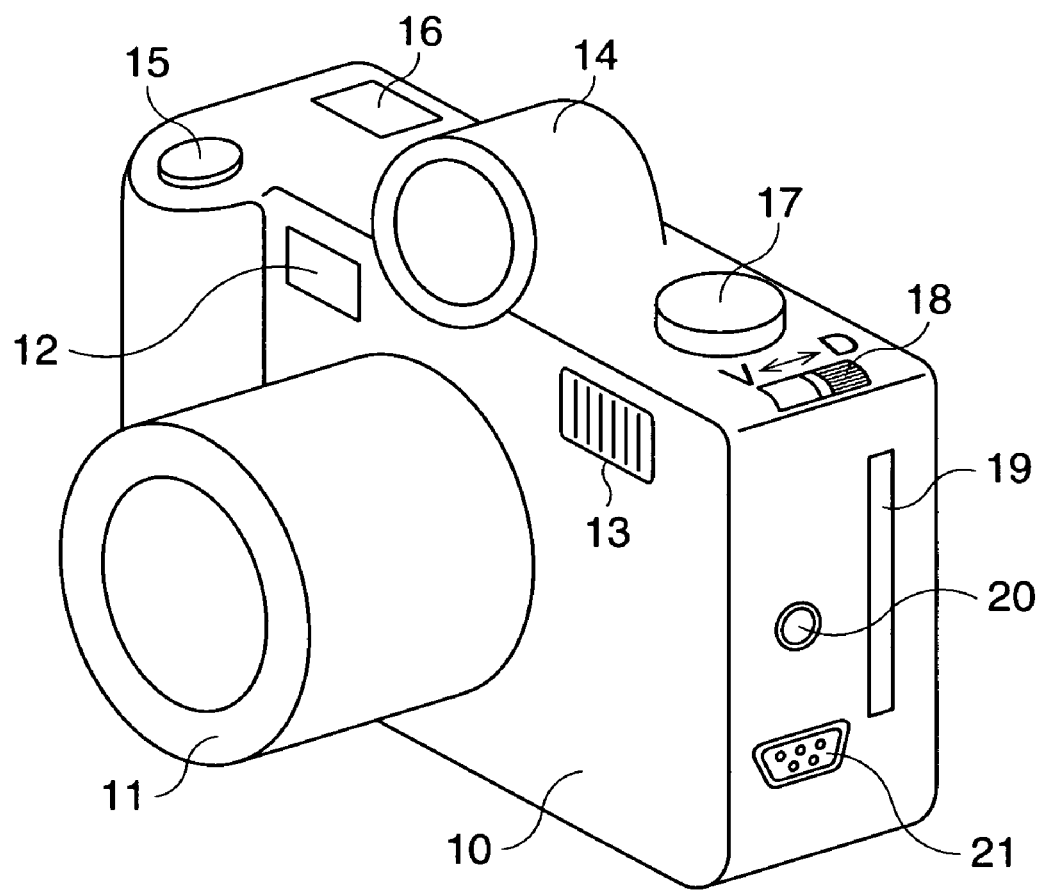
FIG. 1 is a perspective view of a camera provided with a three-dimensional image capturing device of an embodiment of the present invention.

The present invention will be described below with reference to the embodiments shown in the drawings.

FIG. 1 is a perspective view of a camera type three-dimensional image capturing device of a first embodiment of the present invention.

On a front surface of a camera body 10, a view-finder window 12 is provided toward a left-upper edge, adjacent to a photographing lens 11, and an electronic flash 13 is disposed toward a right-upper edge. On an upper surface of the camera body 10, a light emitting device (i.e., a light source) 14, which radiates a laser beam (an infrared laser beam, for example, being a distance measuring light beam) is mounted above the photographing lens 11. A release switch 15 and a liquid crystal display panel 16 are provided on a left side of the light emitting device 14, and a mode change dial 17 and a V/D mode switch 18 are provided on a right side of the device 14. On a side surface of the camera body 10, a card slot 19 is formed into which a recording medium, such as an IC memory card, is insertable, and a video output terminal 20 and an interface connector 21 are also provided.

Figure 2:
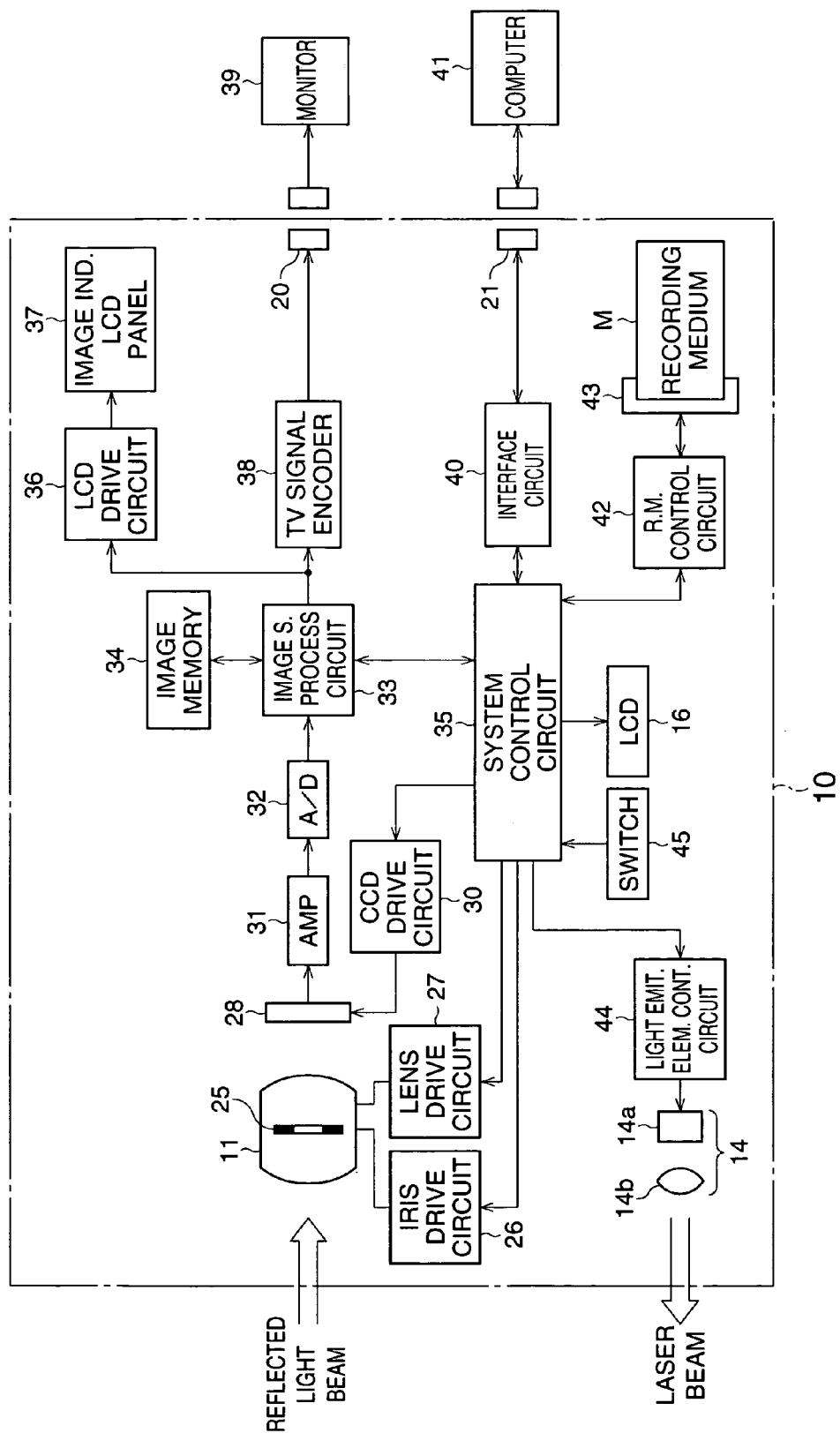
FIG. 2 is a block diagram of the circuit configuration of the camera shown in FIG. 1.

FIG. 2 is a block diagram of the circuit configuration of the camera shown in FIG. 1.

An aperture 25 is provided in the photographing lens 11. The opening degree of the aperture 25 is adjusted by an iris drive circuit 26. A focusing operation and a zoom operation of the photographing lens 11 are controlled by a lens drive circuit 27.

An imaging device (CCD) 28 is disposed on an optical axis of the photographing lens 11. A subject image is formed on a light receiving surface of the CCD 28 through the photographing lens 11, and an electric charge corresponding to the subject image is generated therein. An operation, such as an accumulating operation and a reading operation of the electric charge of the CCD 28, is controlled by a CCD drive circuit 30. An electric charge signal, i.e., an image signal, read from the CCD 28 is amplified by an amplifier 31, and is converted from an analog signal to a digital signal by an A/D converter 32. The digital image signal is subjected to a process, such as a gamma correction, in the image signal process circuit 33, and is temporarily stored as digital image data in an image memory 34. The iris drive circuit 26, the lens drive circuit 27, the CCD drive circuit 30 and the image signal process circuit 33 are controlled by a system control circuit 35.

The digital image data are read from the image memory 34, and supplied to an LCD drive circuit 36, which is operated in accordance with the digital image data, so that an image corresponding to the digital image data is indicated on an image indication LCD panel 37.

The digital image data read from the image memory 34 are also transmitted to a TV signal encoder 38, so that the digital image data can be transmitted to a peripheral monitor device 39, provided externally to the camera body 10, through a video output terminal 20. The system control circuit 35 is connected to an interface circuit 40, which in turn is connected to an interface connector 21. Therefore, the digital image data read from the image memory 34, can also be transmitted to a computer 41 connected to the interface connector 21. Further, the system control circuit 35 is connected to an image recording device 43 through a recording medium control circuit 42. Therefore, the digital image data read from the image memory 34 can be recorded in a recording medium M, such as an IC memory card, mounted in the image recording device 43. Further, digital image data stored once in the recording medium M may be read from the recording medium M in accordance with need and displayed through the system control circuit 35 on the LCD panel 37.

A light emitting element control circuit 44 is connected to the system control circuit 35. The light emitting device 14 is provided with a light emitting element 14a and an illumination lens 14b. The light emitting element control circuit 44 controls the operation of the light emitting element 14a. The light emitting element 14a emits a laser beam for measurement of distance. This laser beam irradiates the entire subject through the illumination lens 14b. The laser beam reflected by the object strikes the camera lens 11. By detecting the laser beam with the CCD 28 provided with a plurality of photo-diodes, which are two-dimensionally disposed on a surface thereof, a three-dimensional image is sensed, as described later. Note that in this measurement, the timing of the transfer operation etc. at the CCD 28 is controlled by the system control circuit 35 and CCD drive circuit 30.

The liquid crystal display panel 16 and a switch group 45, including the release switch 15, the mode change dial 17, the V/D mode switch 18 and 3D mode switch 61 are connected to the system control circuit 35.

Figure 3:
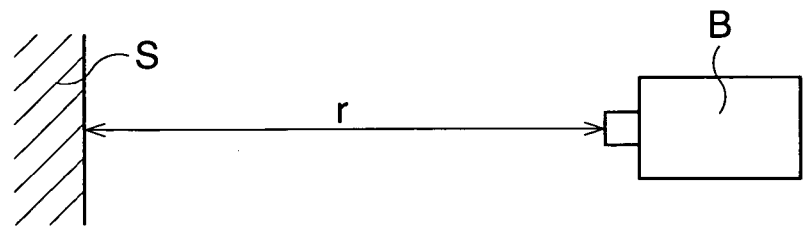
FIG. 3 is a view showing a principle behind a distance measurement.
Figure 4:
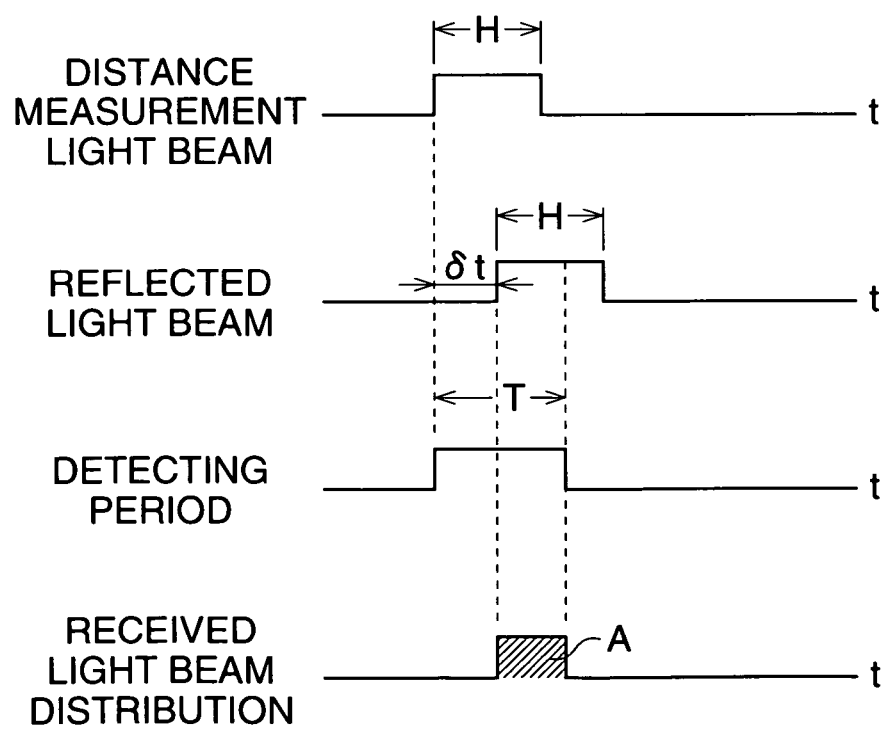
FIG. 4 is a timing chart showing a distance measurement light beam, a reflected light beam, a gate pulse and a distribution of an amount of a light beam received by a CCD.

With reference to FIGS. 3 and 4, a principle behind a distance measurement in the embodiment is described below. Note, in FIG. 4, the abscissa indicates time "t".

A distance measuring light beam output by a distance measurement device B is reflected by a measurement subject S, and the reflected light beam is sensed by a CCD (not shown). The distance measuring light beam is a pulse, the width of which is "H". Accordingly, the reflected light beam is a pulse, the width of which is "H", similarly to the distance measuring light beam. Therefore, a rise of the pulse of the reflected light beam occurs after a rise of the pulse of the distance measuring light beam by a time δ·t (δ is a delay coefficient). Since the distance measuring light beam and the reflected light beam have both traveled a distance "r" between the distance measurement device B and the measured subject S, the distance "r" is represented as follows:

$$r = \delta \cdot t \cdot C/2 \qquad (1)$$

wherein "C" is the speed of light.

For example, by setting a condition in such a manner that the reflected light beam can only be sensed from a rise of the pulse of the distance measuring light beam to a point prior to a fall of the pulse of the reflected light beam, i.e., by providing a gate pulse corresponding to a reflected light beam detecting period T, an amount "A" of received light from the reflected light beam becomes a function of the distance "r". Namely, the greater the distance "r" (or the greater the time δ·t), the less the received light amount A.

In the embodiment, by taking advantage of the principle described above, the received light amount A is sensed using each of the photo-diodes (photoelectric conversion elements) of the CCD 28, the distance from the camera body 10 to each point on the surface of the measurement subject S is sensed, and data of the three-dimensional image, which indicates a topography of the measurement subject S, can be obtained concurrently.

Figure 5:
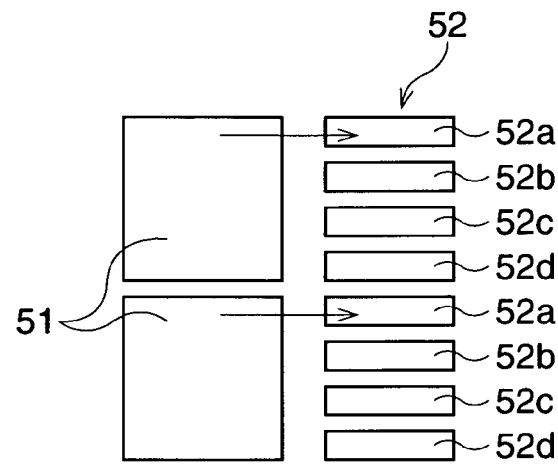
FIG. 5 is a plan view showing a disposition of photodiodes and a vertical transfer unit, which are provided in the CCD.
Figure 6:
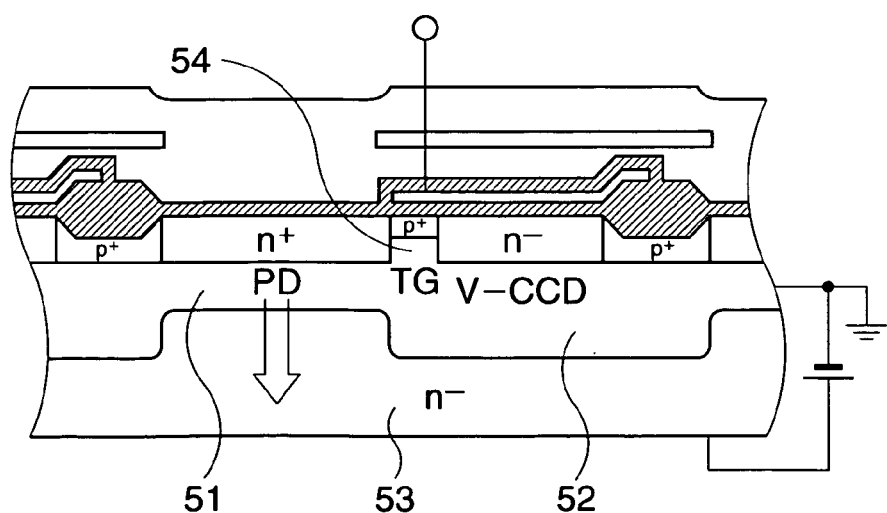
FIG. 6 is a sectioned elevational view of the CCD.

FIG. 5 is a plan view showing a disposition of the photo-diodes 51 and a vertical transfer unit 52, which are provided in the CCD 28. Actually, a multitude of photo-diodes 51 are arranged in a matrix, and a corresponding vertical transfer unit 52 is disposed beside each vertical column of photo-diodes 51. FIG. 6 is a sectioned elevational view of the CCD 28 in which the CCD 28 is cut by a plane perpendicular to a substrate 53. The CCD 28 is an interline CCD of vertical overflow drain (VOD) type, in which unwanted charge is discharged to the substrate 53.

The photo-diodes 51 and the vertical transfer unit (signal charge holding unit) 52 are formed along a surface of the n-type substrate 53. A plurality of the photo-diodes 51 are two-dimensionally disposed in a matrix arrangement, and the vertical transfer unit 52 is disposed adjacent to the photo-diodes 51, parallel to rows extending in a vertical direction in FIG. 5. The vertical transfer unit 52 has four vertical transfer electrodes 52a, 52b, 52c and 52d, which correspond to each of the photo-diodes 51. Therefore, in the vertical transfer unit 52, four potential wells can be formed, so that a signal charge is output from the CCD 28 by controlling a depth of the wells, as is well known. Note that a number of the vertical transfer electrodes can be changed, depending upon the requirement of the CCD 28.

The photo-diodes (PD) 51 and the vertical transfer unit (V-CCD being signal charge holding unit) 52 are disposed in a p-type well formed on a surface of the substrate 53. The p-type well is completely depleted due to an inverse bias voltage applied between the p-type well and the n-type substrate 53. In this state, electric charge is accumulated in the photo-diodes 51, and an amount of the electric charge corresponds to an amount of an incident light beam, which is the reflected light beam reflected by the measurement subject. When a substrate voltage is changed to a value greater than a predetermined value, electric charge accumulated in the photo-diodes 51 is discharged to the substrate 53. Conversely, when an electric charge transfer signal, which is a voltage signal, is applied to a transfer gate (TG) 54, the electric charge accumulated in the photo-diodes 51 is transferred to the vertical transfer unit 52. Namely, after the electric charge is discharged to the substrate 53 by the electric charge discharging signal, the signal charge accumulated in the photo-diode 51 is transferred to the vertical transfer unit 52 by the electric charge transfer signal. By repeating the discharge and the transfer, an electronic shuttering operation is performed.

Figure 7:
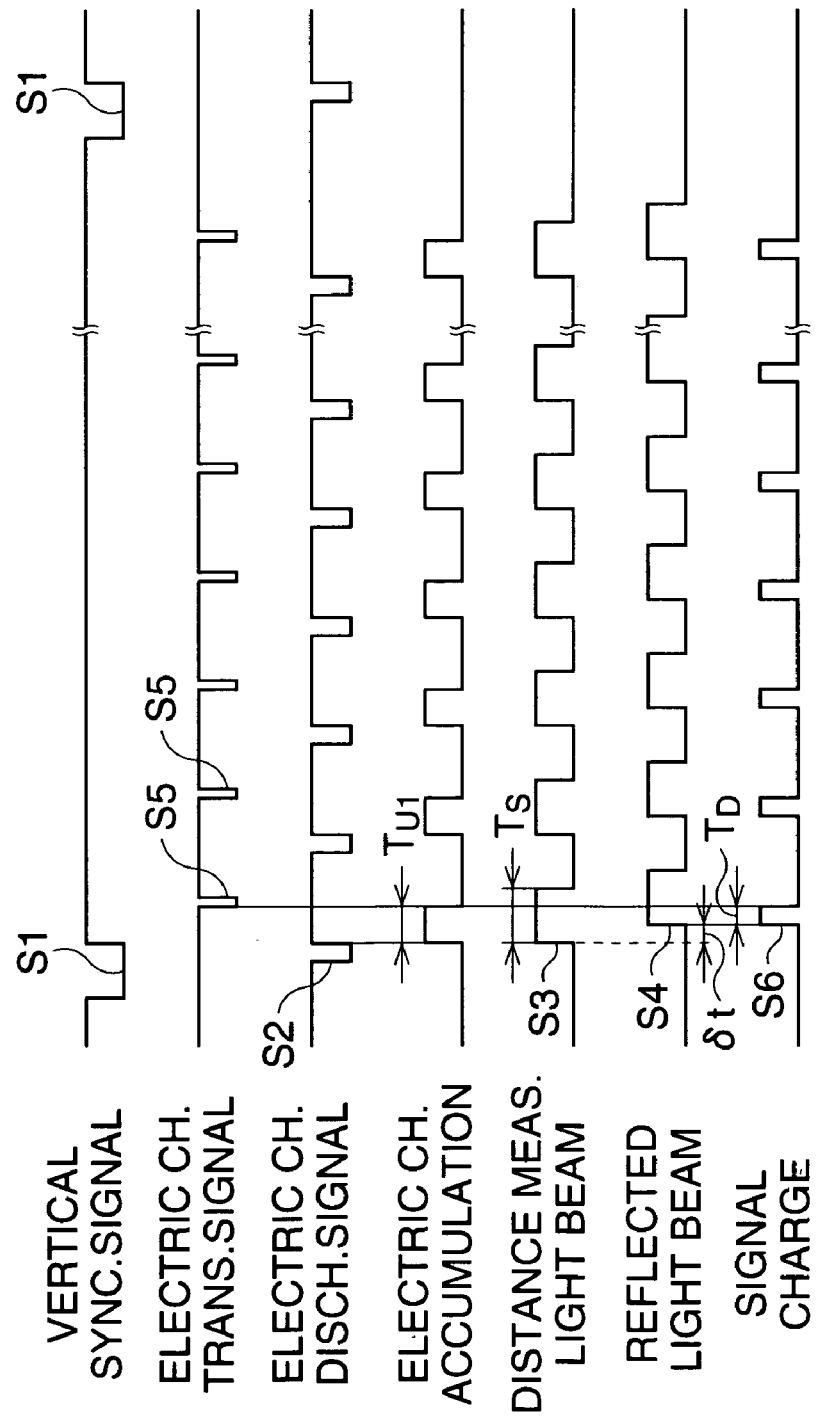
FIG. 7 is a timing chart of a distance information sensing operation by which data, corresponding to a distance from a camera body to each point on a surface of the measurement subject, is sensed.

FIG. 7 is a timing chart of a distance information sensing operation by which data, corresponding to the distance from the camera body 10 to each point on a surface of the measurement subject, is sensed. The distance information sensing operation is described below with reference to FIGS. 1, 2, 5, 6 and 7.

In synchronization with an output of a vertical synchronizing signal S1, an electric charge discharging signal (a pulse signal) S2 is output, so that unwanted charge, which is accumulated in the photo-diodes 51, is discharged to the substrate 53. Approximately simultaneously with a completion of the output of the electric charge discharging signal, the light emitting device 14 is actuated, and thus a distance measuring light beam S3, which is a pulsed beam having a constant width, is output therefrom. The distance measuring light beam S3 is reflected by the measurement subject, and enters the CCD 28 as a reflected light beam S4. When a predetermined time has elapsed since the output of the distance measuring light beam S3, an electric charge transfer signal (pulse signal) S5 is output, so that an electric charge accumulated in the photo-diodes 51 is transferred to the vertical transfer unit 52. Note that the electric charge transfer signal S5 is output before the output of a pulse of the distance measuring light beam S3 is completed.

Thus, for a period $T_{U1}$ from the end of the output of the electric charge discharging signal S2 to the beginning of the output of the electric charge transfer signal S5, a signal charge corresponding to distances from the camera body 10 to the measurement subject is accumulated. Namely, although a period $T_S$, for which the distance measuring light beam S3 is output, and the electric charge accumulation period $T_{U1}$ begin approximately simultaneously, the electric charge accumulation period $T_{U1}$ ends prior to a completion of the period $T_S$, so that only a part of the reflected light beam S4 is detected by the CCD 28. A signal charge S6, generated due to the detected light beam, corresponds to the distance from the camera body 10 to the measurement subject. In other words, the signal charge S6, corresponding to a light beam, which includes in the reflected light beam S4 coming from the measurement subject and which reaches the photo-diodes 51 within the electric charge accumulation period $T_{U1}$, is accumulated in the photo-diodes 51. The signal charge S6 is transferred to the vertical transfer unit 52 by the electric charge transfer signal S5. Note that the period $T_S$, for which the distance measuring light beam S3 is output, can begin prior to the electric charge accumulation period $T_{U1}$, if necessary.

After a predetermined time has elapsed since the output of the electric charge transfer signal S5, the electric charge discharging signal S2 is again output, so that unwanted charge, which is accumulated in the photo-diodes 51 after the transfer of the signal charge S6 to the vertical transfer unit 52, is discharged to the substrate 53. Thus, another signal charge is accumulated in the photo-diodes 51. Then, similarly to the above description, when the electric charge accumulation period $T_{U1}$ has again elapsed, the signal charge S6 is transferred to the vertical transfer unit 52.

The transferring operation of the signal charge S6 to the vertical transfer unit 52 is repeatedly performed until the next vertical synchronizing signal S1 is output. Thus, the signal charge S6 is integrated in the vertical transfer unit 52. The signal charge S6 integrated for one field period, which is between two vertical synchronizing signals S1, corresponds to distance information of the measurement subject, on condition that the measurement subject is stationary for the period between the two vertical synchronizing signals S1.

The detecting operation of the signal charge S6 described above is carried out in all of the photo-diodes 51 provided in the CCD 28. As a result of the detecting operation for one field period, the distance information sensed by the photo-diodes 51 is held in each corresponding vertical transfer unit 52, which is located adjacent to each column of photo-diodes 51. The distance information is output from the CCD 28 by a vertical transferring operation of the vertical transfer units 52 and a horizontal transferring operation of a horizontal transfer unit (not shown). The distance information is output from the CCD 28 by a vertical transfer operation of the vertical transfer units 52 and a horizontal transfer operation of not shown horizontal transfer units.

The reflected light beam detected by the CCD 28 is affected by the reflectance of the surface of the subject. Therefore, the distance information obtained through the reflected light beam contains error derived from the reflectance. Further, the reflected light beam sensed by the CCD 28 may contain an extra component, such as ambient daylight, being other than the reflected light beam from the measurement subject, which can cause an error. Next, methods of correcting such errors will be explained with reference to FIG. 8 to FIG. 10 and FIG. 11A, FIG. 11B, FIG. 12A, and FIG. 12B.

First, the modes are set by manually operating mode switches provided on the camera. That is, the V/D mode switch 18 is operated to set either the video (V) mode or the distance-measurement (D) mode. Further, the three-dimensional image capturing mode (3D mode) switch 61 provided at the back of the camera body 10 (see FIG. 12A, FIG. 12B) is manually operated to switch the ON/OFF status of the three-dimensional image capturing mode. The three-dimensional image capturing mode is a mode which detects pairs of image information and distance information by executing operations in V mode and D mode sequentially. The image data and distance measurement data are obtained from the sets of detected image information and distance information, and are stored in a recording medium with their correspondence maintained. In the three-dimensional image capturing mode of the first embodiment, the corresponding image data and distance measurement data are stored in the recording medium as a single file so as to maintain the correspondence between the image data and distance measurement data.

When it is determined at step 101 that the release switch 15 is fully depressed, the routine proceeds to step 102 where it is then determined which of the video (V) mode or distance-measurement (D) mode is selected. When the D mode is selected, the routine proceeds to step 103, where the vertical synchronizing signal S1 is output and distance measuring light beam control is started. Namely, the light emitting device 14 is driven so that the distance measuring light beam S3 is intermittently output as a pulsed beam. Then, Step 104 is executed so that a sensing operation control of the CCD 28 is started. Namely, the distance information sensing operation described with reference to FIG. 7 is started, and thus the electric charge discharging signal S2 and the electric charge transfer signal S5 are alternately output, so that the signal charge S6 of the distance information is integrated in the vertical transfer unit 52.

At step 105, it is determined whether one field period has elapsed since the beginning of the distance information sensing operation, i.e., whether a new vertical synchronizing signal S1 has been output. When one field period has passed, the routine proceeds to step 106, wherein a signal charge S6 of the distance information is output from the CCD 28. The signal charge S6 is temporarily stored in the image memory 34, at step 107. Then, at step 108, the distance measuring light beam control is switched off and the light emitting operation of the light emitting device 14 is stopped.

Figure 8:
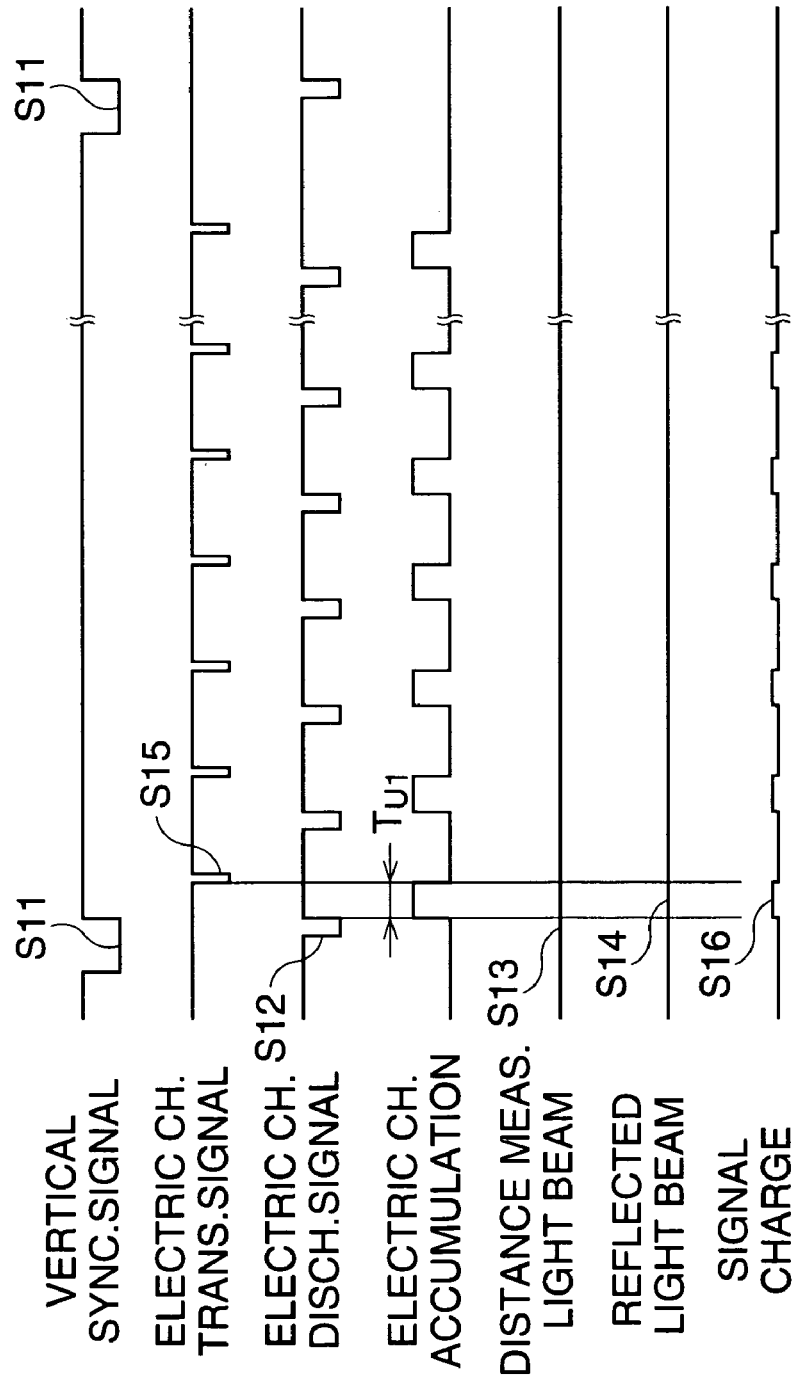
FIG. 8 is a timing chart of a distance correction information sensing operation.
Figure 11A:
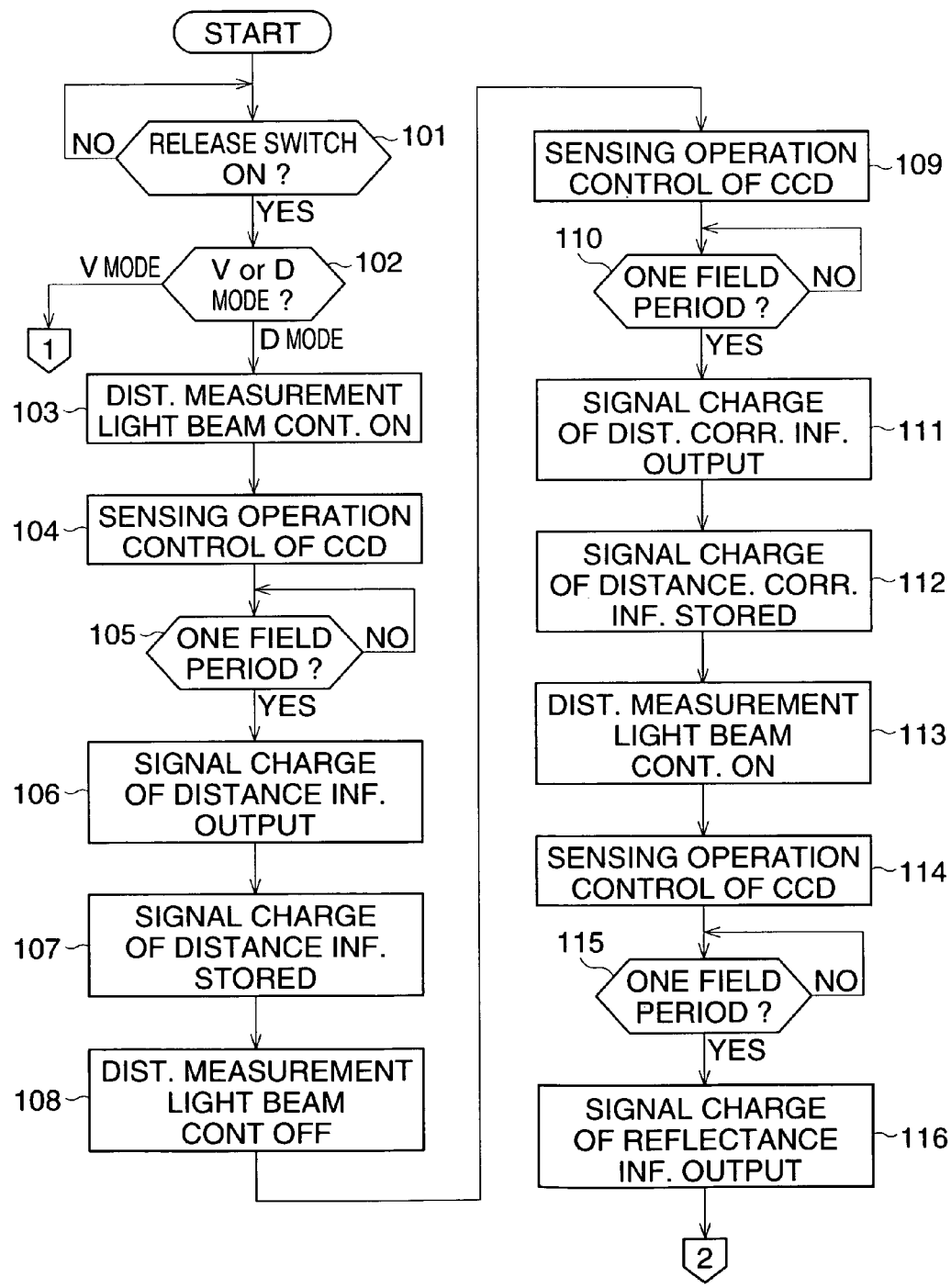
FIG. 11A and FIG. 11B show a flowchart of the distance information sensing operation and image information sensing operation in the first embodiment.
Figure 11B:
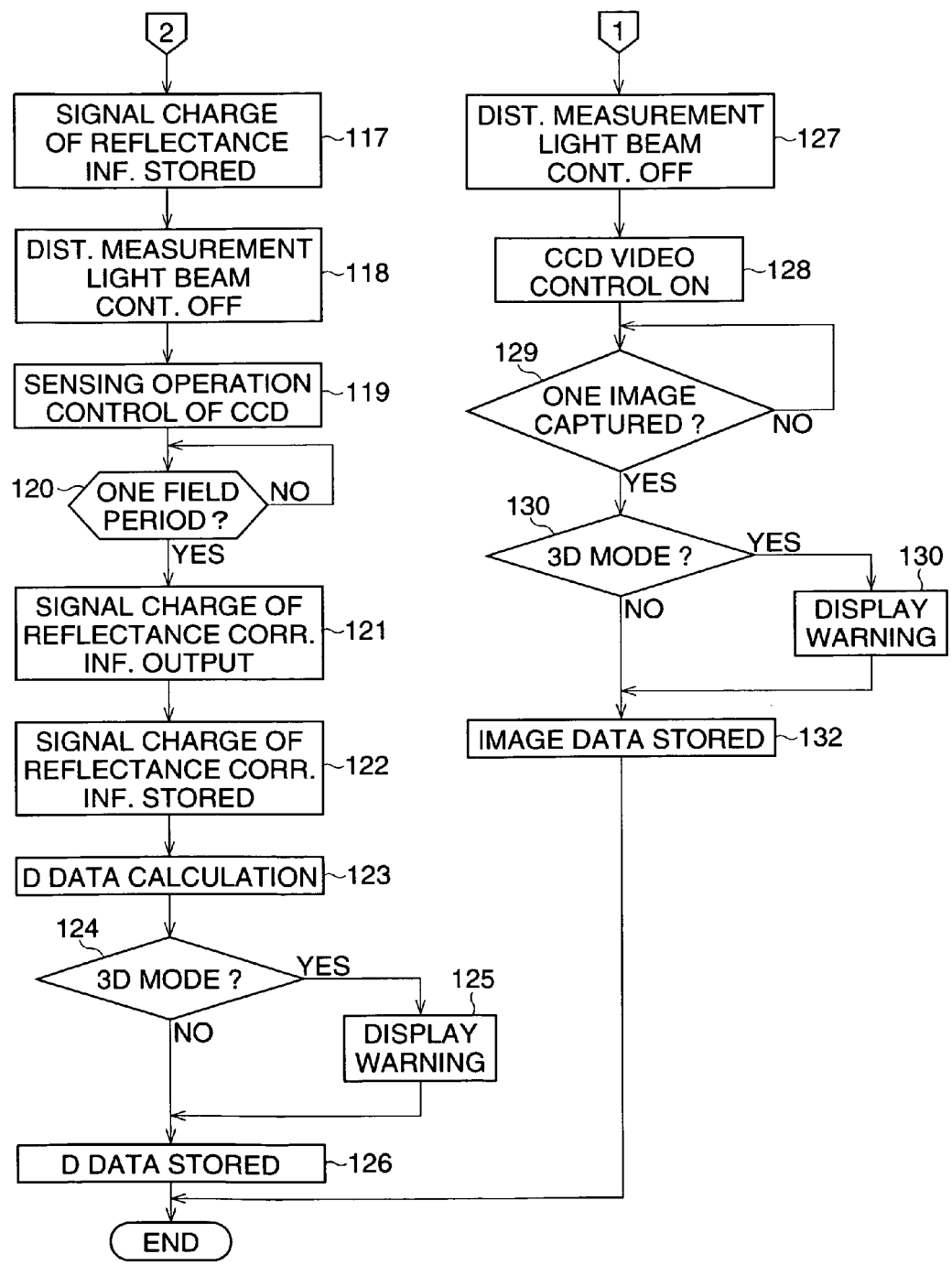
Figure 12A:
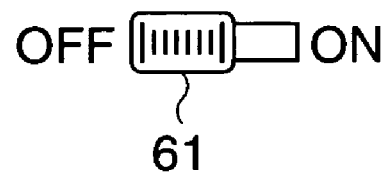
FIG. 12A and FIG. 12B are views of a three-dimensional image capturing mode (3D mode) switch provided at the back of a camera.
Figure 12B:
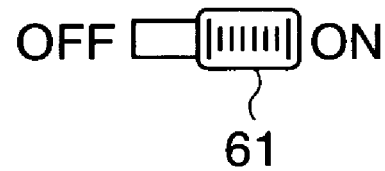

At steps 109 to 112, the distance correction information sensing operation is performed. At step 109, as shown in FIG. 8, a vertical synchronizing signal S11 is output and a sensing operation control of the CCD 28 is started. Namely, an electric charge discharging signal S12 and an electric charge transfer signal S15 are alternately output while the light emitting operation of the light emitting device 14 is not carried out, i.e., while the light source is not illuminated. Although the electric charge accumulation period $T_{U1}$ is the same as that of the distance information sensing operation shown in FIG. 7, the distance measuring light beam does not irradiate the measurement subject (reference S13), and thus there is no reflected light beam (reference S14). Therefore, although a signal charge of the distance information is not generated, a signal charge S16 corresponding to an interference or noise component is generated, since the noise component, such as ambient daylight, enters the CCD 28. The signal charge S16 corresponds to distance correction information, which is used for correcting an error generated in the distance information due to the noise component, and is related to the electric charge accumulation period $T_{U1}$.

At step 110, it is determined whether one field period has elapsed since the beginning of the distance correction information sensing operation, i.e., whether a new vertical synchronizing signal S11 has been output. When one field period has passed, the routine proceeds to step 111, where the signal charge S16 of the distance correction information is output from the CCD 28. The signal charge S16 of the distance correction information is then temporarily stored in the image memory 34 at step 112.

At steps 113 through 117, the reflectance information sensing operation is performed. At step 113, as shown in FIG. 9, a vertical synchronizing signal S21 is output, distance measuring light beam control of the CCD 28 is started, so that a distance measuring light beam S23 is intermittently output as a pulsed beam. At step 114, sensing operation control of the CCD 28 is started, and an electric charge discharging signal S22 and an electric charge transfer signal S25 are alternately output. The reflectance information sensing operation is controlled so that all of the reflected light beam S24 is received within an electric charge accumulation period $T_{U2}$, which is from an end of an output of the electric charge discharging signal S22 to a beginning of an output of the electric charge transfer signal S25. Namely, a width $T_S$ of the signal charge S26 accumulated in each of the photodiodes 51 of the CCD 28 is the same as a width $T_S$ of the distance measuring light beam S23.

Therefore, the signal charge S26 does not depend upon the distance to the subject and corresponds only to the reflectance information which depends on the reflectance of the surface of the subject.

At step 115, it is determined whether one field period has elapsed since the beginning of the reflectance information sensing operation, i.e., whether a new vertical synchronizing signal S21 has been output. When one field period has passed, the routine proceeds to step 116, where the signal charge S26 of the reflectance information is output from the CCD 28. The signal charge S26 is then temporarily stored in the image memory 34 at step 117. Then, at step 118, the distance measuring light beam control is turned OFF, and the light emitting operation of the light emitting device 14 is stopped.

At steps 119 through 122, the reflectance correction information sensing operation is performed. At step 119, as shown in FIG. 10, a vertical synchronizing signal S31 is output, and sensing operation control of the CCD 28 is started. Namely, an electric charge discharging signal S32 and an electric charge transfer signal S35 are alternately output while the light emitting operation of the light emitting device 14 is not carried out. Although the electric charge accumulation period $T_{U2}$ is the same as that of the reflectance information sensing operation shown in FIG. 9, the distance measuring light beam does not irradiate the measurement subject (reference S33), and thus there is no reflected light beam (reference S34). Therefore, although a signal charge of the reflectance information is not generated, a signal charge S36 corresponding to an interference component or a noise component is generated, since the noise component, such as ambient daylight, enters the CCD 28. The signal charge S36 corresponds only to reflectance correction information, which is used for correcting an error generated in the reflectance information due to the noise component, and is related to the electric charge accumulation period $T_{U2}$.

At step 120, it is determined whether one field period has elapsed since the beginning of the reflectance correction information sensing operation, i.e., whether a new vertical synchronizing signal S31 has been output. When one field period has passed, the routine proceeds to step 121, where the signal charge S36 of the reflectance correction information is output from the CCD 28. At step 122, the signal charge S36 is temporarily stored in the image memory 34. At steps 123, the distance information, distance correction information, reflectance information, and reflectance correction information obtained at steps 103 to 122 are used for computation of the distance measurement (D) data.

At step 124, it is determined whether the 3D mode is set or not. When it is determined that the 3D mode is set, the routine proceeds to step 125, where a warning is displayed at the display 16. Namely, it displays the fact that the operating mode currently set is the 3D mode and, if the corresponding image information has not yet been detected, an instruction to switch the V/D mode switch 18 to the V mode for detecting the image information is displayed. When the operator manually changes the V/D mode switch 18 to the V mode, the routine proceeds to step 126, where the distance measurement (D) data is output and stored in the recording medium M, and then the sensing operation ends. When it is determined at step 124 that the 3D mode has not been set, the routine immediately proceeds to step 126, where the distance measurement (D) data is stored in the recording medium M, and then the sensing operation ends. Note that the method of output of the distance measurement data and the image data at step 126 and step 132 differ depending on whether the operating mode is set to the 3D mode or not. Details will be given later.

On the other hand, when it is determined at step 102 that the V mode has been selected, the routine proceeds to step 127, where the distance measuring light beam control is turned OFF. The routine then proceeds to step 128, where the normal photographing operation (CCD video control) of the CCD 28 is turned ON. At step 129, the capture of the image is confirmed. When one image has been captured, the routine proceeds to step 130. At step 130, it is determined if the operating mode has been set to the 3D mode. When it is determined that the 3D mode has been set, the routine proceeds to step 131, where a warning message is displayed on the LCD 16. The message instructs the operator to change the operation mode to the D mode to detect distance information. When the operator manually switches the V/D mode switch 18 to the D mode, the routine proceeds to step 132, where the image signal obtained by CCD video control is converted to a predetermined data format and stored in the recording medium M as the image data. The sensing operation then ends. When it is determined that the operating mode has been not set to the 3D mode at step 130, the routine immediately proceeds to step 132, where the image data is stored in the recording medium M and the sensing operation ends.

With reference to FIGS. 7 through 10, the contents of the calculation executed in Step 123 are described below.

It is supposed that the measurement subject of reflectance R is illuminated and an image of the measurement subject is formed on the CCD 28 while considering the measurement subject to be a two-dimensional light source. At this time, an output Sn, which is obtained by integrating an electric charge generated in a photo-diode for an electric charge accumulation period "t", is indicated as follows:

$$Sn = k \cdot R \cdot I \cdot t \quad (2)$$

wherein "k" is a proportional coefficient, which is varied in accordance with an F-number and a magnification of the photographing lens.

When the measurement subject is illuminated by light output from a light source, such as an infrared laser source, the luminance I is obtained by combining a luminance $I_S$, due to the light source and a luminance $I_B$ due to the ambient light, which is indicated as follows:

$$I = I_S + I_B \quad (3)$$

As shown in FIG. 7, it is supposed that the electric charge accumulation period is $T_{U1}$, the pulse width of the distance measuring light beam S3 is $T_S$, a pulse width of the signal charge S6 of the distance information is $T_D$, and the electric charge accumulation period is repeated N times for one field period. An output $SM_{10}$ of the CCD is:

$$SM_{10} = \Sigma(k \cdot R \cdot (I_S \cdot T_D + I_B \cdot T_{U1})) = k \cdot N \cdot R \cdot (I_S \cdot T_D + I_B \cdot T_{U1}) \quad (4)$$

wherein the pulse width $T_D$ is indicated as follows:

$$T_D = T_{U1} - \delta \cdot t = T_{U1} - 2r/C \quad (5)$$

As shown in FIG. 9, when the electric charge accumulation period $T_{U2}$ is greater than the pulse width $T_S$, such that the electric charge accumulation period $T_{U2}$ is large enough to receive the whole of the reflected light beam, an output $SM_{20}$ of the CCD is:

$$SM_{20} = \Sigma(k \cdot R \cdot (I_S \cdot T_S + I_B \cdot T_{U2})) = k \cdot N \cdot R \cdot (I_S \cdot T_S + I_B \cdot T_{U2}) \quad (6)$$

As shown in FIG. 8, when the light beam is turned OFF to carry out a pulse-shaped electric charge accumulation, having a same width as that of FIG. 7, an output $SM_{11}$ of the CCD is:

$$SM_{11} = \Sigma(k \cdot R \cdot I_B \cdot T_{U1}) = k \cdot N \cdot R \cdot I_B \cdot T_{U2} \quad (7)$$

Similarly, an output $S_{21}$ of the CCD, which is obtained when an electric charge accumulation shown in FIG. 10 is performed, is $$SM_{21} = \Sigma(k \cdot R \cdot I_B \cdot T_{U2}) = k \cdot N \cdot R \cdot I_B \cdot T_{U2} \quad (8)$$

Based on the formulas (4), (6), (7) and (8), a following formula is obtained:

$$S_D = (SM_{10} - SM_{11})/(SM_{20} - SM_{21}) = T_D/T_S \quad (9)$$

As described above, the distance measuring light beam S3 and the reflected light beam S4 contain noise, such as ambient daylight (i.e., a luminance $I_B$ due to ambient daylight). $T_D/T_S$ included in the formula (9) indicates that an amount of the reflected light beam S4 from the measurement subject, when the distance measuring light beam S3 is radiated, is normalized by an amount of the distance measuring light beam S3, and is equal to a ratio of a value in which the noise component ($SM_{11}$) (corresponding to the electric charge S16 shown in FIG. 8) is subtracted from the amount of the distance measuring light beam S3 ($SM_{10}$) (corresponding to the signal charge S6 shown in FIG. 7), to a value in which the noise component ($SM_{21}$) (corresponding to the electric charge S36 shown in FIG. 10) is subtracted from an amount of the reflected light beam S4 ($SM_{20}$) (corresponding to the signal charge S26 shown in FIG. 9).

$SM_{10}$, $SM_{11}$, $SM_{20}$ and $SM_{21}$ included in the formula (9) are stored as the distance information, the distance correction information, the reflectance information and the reflectance correction information, in Steps 107, 112, 117 and 122, respectively. Therefore, based on the information, $T_D/T_S$ is obtained. Since the pulse width $T_S$ is known, the distance "r" is obtained from formula (5) and $T_D/T_S$.

Thus, based on the formulas (5) and (9), the distances "r" from the camera body to each point on the surface of the measurement subject are corrected, so that an accuracy of a distance sensing is improved.

Note that, in the present embodiment, an influence derived from noise, such as ambient daylight, is removed from the distance information of the measurement subject. Nevertheless, in a case where the influence can be neglected, the values of the signal charge regarding the influence (i.e., $S_{11}$ and $S_{21}$) can be omitted from formula (9). Thus, a correction regarding only the reflectance of the surface of the measurement subject is carried out.

Further, in the present embodiment, although the accumulation of signal charge is performed for one field period in Steps 105, 110, 115 and 120, respectively, the accumulation may be carried out for a plurality of field periods.

Figure 13:
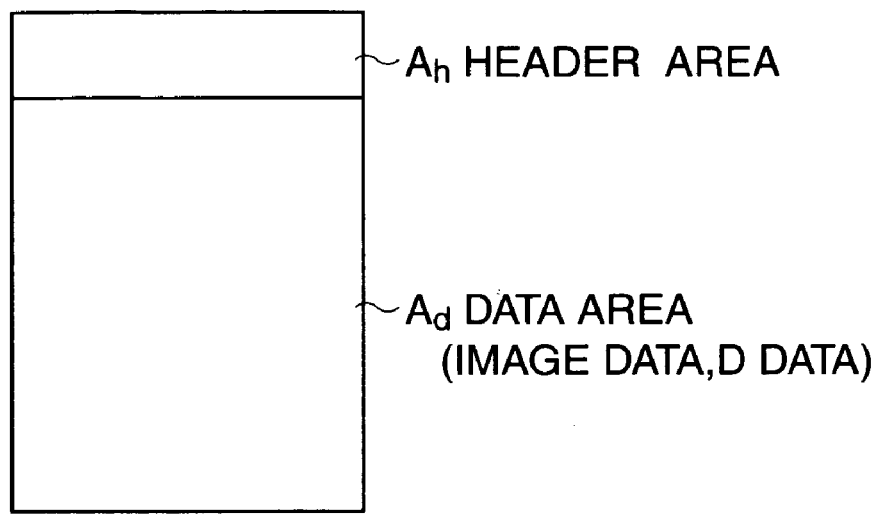
FIG. 13 is a view of the general structure of a three-dimensional image information file storing distance measurement data and image data in the first embodiment.
Figure 14:
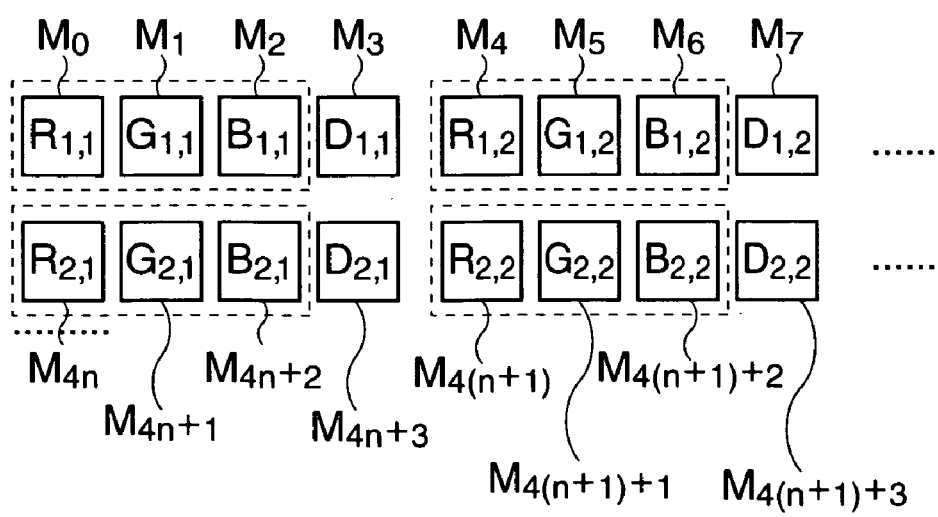
FIG. 14 is a view of the general structure of the image data and distance measurement data stored in the three-dimensional information file in the first embodiment.

With reference to FIG. 13 and FIG. 14, the method of output of data at step 126 and step 132 is explained.

When the three-dimensional image capturing mode (3D mode) is not set, the distance measurement data output at step 126 and the image data output at step 132 are stored in separate files. On the other hand, when the 3D mode is set, the distance measurement data output at step 126 and the image data output at step 132 are stored in a same file created in the recording medium M as a three-dimensional image information file, a file storing both corresponding image data and distance measurement data. That is, for example, when capturing an image in the V mode after setting the three-dimensional image capturing mode, namely when the switch 61 is set to the 3D mode, the RGB image data is output to the recording medium at step 132, in accordance with the format of the three-dimensional image information file. Then, the V/D mode switch 18 is switched to the D mode for measurement of the distance. When the 3D mode is set, at step 126, the distance measurement data is output in accordance with the format of a three-dimensional image information file as well as the file output at step 132 in the V mode. The detail of the format of the three-dimensional image information file is given hereinafter.

FIG. 13 schematically shows the structure of the three-dimensional image information file. The three-dimensional image information file may be roughly divided into a file management area (header area) $A_h$ and data area $A_d$. For example, the header area $A_h$ stores the information that the image data is luminance information relating to the red (R), green (G), and blue (B), the order in which the data is stored, the number of bytes for the image data and other information relating to the image data; the date when the image was captured, the name of the photographer, the photographing conditions, and other information relating to the photographing; the unit of distance for the distance measurement data, the format of the distance measurement data, the number of bytes for the distance measurement data, and other information relating to the distance measurement data; and etc.

The data area $A_d$ stores RGB image data for each pixel output at step 132 and distance measurement data output at step 126. FIG. 14 schematically shows the arrangement of the RGB image data and distance measurement data in the memory. In FIG. 14, the arrangement of data in the memory is described in correspondence with the physical arrangement of the pixels or photo-diodes on the CCD 28. Therefore, the arrangement of image data and distance measurement data are described two-dimensionally, while the actual address of the memory is one-dimensional. Namely, $M_0$, $M_1$, and $M_2$ store the image data or the pixel values $R_{1,1}$, $G_{1,1}$, and $B_{1,1}$ relating to the RGB in the leftmost pixel of the first line of the CCD 28, while $M_3$ stores the distance measurement data $D_{1,1}$ corresponding to the pixel. Similarly, $M_4$ to $M_7$ store the image data $R_{1,2}$, $G_{1,2}$, and $B_{1,2}$ for the second pixel from the left of the first line of the CCD 28 and the distance measurement data $D_{1,2}$ corresponding to the pixel. $M_{4n}$ to $M_{4n+3}$ store the image data $R_{2,1}$, $G_{2,1}$, and $B_{2,1}$ for the leftmost pixel of the second line of the CCD 28 and the distance measurement data $D_{2,1}$ corresponding to the pixel. Note that n is the number of pixels in the horizontal direction.

At step 132, the RGB pixel data is output to the three-dimensional image information file on the recording medium in accordance with the above format. Namely, the header area $A_h$ stores the information relating to the image data, while the area relating to the distance measurement data is left as an empty area. Further, the data area $A_d$ also stores only the RGB image data, while the area storing the distance measurement data is left as an empty area.

At step 126, the distance measurement data is output in accordance with the above format. The distance measurement data is stored in the data area left as an empty area at step 132. During this time, the information relating to the photographing, such as the date when the image was captured, the name of photographer and etc., are manually or automatically stored in the header area $A_h$ of the file. Due to the above methods, the image data and distance measurement data for the subject are stored in the recording medium M as one set of three-dimensional image information.

As explained above, according to the first embodiment, high precision three-dimensional image information can be stored without using a large storage space. Since the distance measurement data is stored in the area that corresponds directly to the arrangement of the pixels, the distance to each part of the subject can be quickly and easily obtained and three-dimensional image processing using the distance measurement data can be easily performed. Further, since each of the image data and distance measurement data are stored adjacently, even when performing three-dimensional image processing simultaneously with two-dimensional image display, distance measurement data corresponding to the image data can be obtained quickly and easily.

Figure 15:
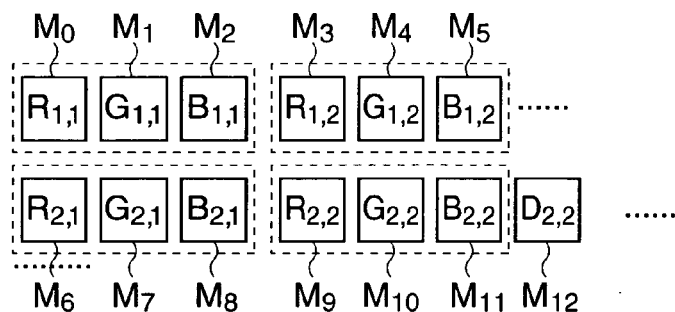
FIG. 15 is a view of the general structure of the image data and distance measurement data stored in a three-dimensional information file in a second embodiment.

With reference to FIG. 15, an explanation of a second embodiment of the present invention will be given. The mechanical configuration, electrical configuration, and distance information sensing operation in the three-dimensional image capturing device of the second embodiment are similar to those of the first embodiment. The difference between the first embodiment and the second embodiment lies only in the format of the three-dimensional image information file.

In the first embodiment, distance measurement data relating to each set of the RGB image data or the pixel is stored. In the second embodiment, however, the pixels are grouped together (for example, pixels are grouped into groups of 4 pixels) and distance measurement data is stored for each group. The figure schematically shows the arrangement in the memory when four pixels are grouped together. Namely, two pixels in the horizontal direction and two in the vertical direction are grouped together. $M_0$, $M_1$, and $M_2$ store the RGB pixel values $R_{1,1}$, $G_{1,1}$, and $B_{1,1}$ for the leftmost pixel of the first line of the CCD 28, while $M_3$, $M_4$, and $M_5$ store the RGB pixels values $R_{1,2}$, $G_{1,2}$, and $B_{1,2}$ for the second pixel from the left of the first line. $M_6$, $M_7$, and $M_8$ store the RGB pixel values $R_{2,1}$, $G_{2,1}$, and $B_{2,1}$ for the leftmost pixel of the second line of the CCD 28, while $M_9$, $M_{10}$, and $M_{11}$ store the RGB pixel values $R_{2,2}$, $G_{2,2}$, and $B_{2,2}$ for the second pixel from the left of the second line. $M_{12}$ stores the value $D_{2,2}$ of the distance measurement data for the second pixel from the left of the second line. Namely, $M_0$ to $M_{12}$ store the three-dimensional image data (a set of image data and distance measurement data) for a first group. The three-dimensional image data of a second group (four pixels) adjacent to the first group is stored in $M_{13}$ to $M_{25}$. The succeeding three-dimensional image data continues to be stored in units of 4 pixels.

In the present embodiment, what is stored as the distance information of each group is the distance measurement data corresponding to the bottom right pixel of the group. However, it may also be the distance measurement data corresponding to another pixel in the group or may be a mean value of the distance measurement data in the group.

As explained above, according to the second embodiment, when distance measurement data as detailed as the image data is not required, it is possible to store distance measurement data for every several pixels and therefore reduce the size of the three-dimensional image information file compared with that of the first embodiment.

Figure 16:
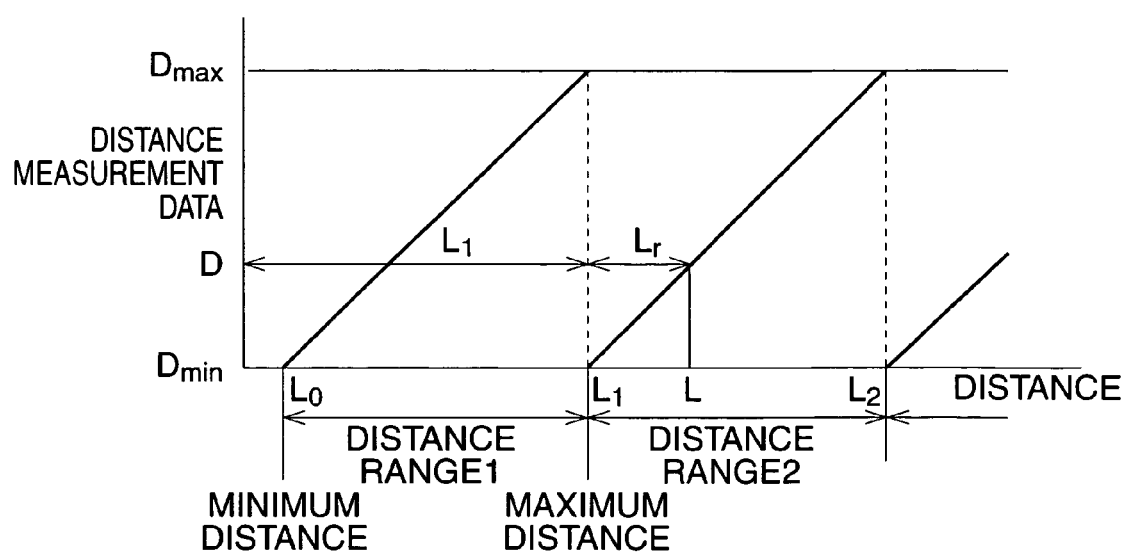
FIG. 16 is a view of the relation between a distance to a subject and relative distance measurement data in a distance range in a third embodiment.

With reference to FIG. 16, an explanation of a third embodiment will be given.

The third embodiment, like the second embodiment, differs from the first embodiment only in the format of the three-dimensional image information file. The rest of the configuration is similar to that of the first embodiment.

The abscissa in FIG. 16 shows the distance to the subject, while the ordinate shows the value of the distance measurement data corresponding to the relative distance in a predetermined distance range. For example, when the distance corresponding to a certain pixel or image data is L, the distance L is expressed as the sum of the minimum distance $L_1$ of the distance range 2 and the relative distance $L_r$ from $L_1$, and the distance measurement data D ($D_{min} \leq D \leq D_{max}$) corresponding to the relative distance $L_r$ is stored in the data area of the three-dimensional image information file. That is, when the distance measurement data D is for example 8-bit or 1-byte data, $D_{min}=0$, $D_{max}=255$, and $L_r$ is expressed by $L_r=D\cdot(L_2-L_1)/256$.

The header area stores, in addition to the information illustrated in the first embodiment, the information of the minimum distance and maximum distance of the distance ranges and information showing which distance range each pixel or each set of data corresponds to. However, the adjacent pixel generally corresponds to the same distance range, so the correspondence between pixels and the distance range does not have to be stored for each pixel. For example, when pixels continuing along the horizontal direction over a certain interval correspond to the same distance range, the address of the data that indicates the start or end of the interval and the distance range in that interval are the only information to be stored. Information relating to the distance range may be the minimum distance and maximum distance of the distance range or may be the minimum distance and its range, i.e. difference between maximum distance and minimum distance.

As explained above, according to the third embodiment, by expressing the distance to a subject by a relative distance in a distance range, it is possible to reduce the number of bits or bytes assigned for one distance measurement data and therefore reduce the storage space of the file as a whole.

Next, with reference to FIG. 17A and FIG. 17B, an explanation for a fourth embodiment will be given. The fourth embodiment expresses the distance measurement data as a difference from a reference distance measurement data. The rest of the configuration is the same as that of the first embodiment.

FIG. 17A and FIG. 17B show the arrangement of distance measurement data corresponding to the physical arrangement of the pixels. The numerical values in FIG. 17A show the distance measurement data when it is expressed by an absolute or relative distance. On the other hand, the numerical values in FIG. 17B show the distance measurement data in FIG. 17A expressed in the form of a difference referenced from adjacent distance measurement data in a predetermined direction of the memory. When there is no distance measurement data to refer to, the distance measurement data corresponding to the absolute or relative distance is used. For example, in the case of the top left distance measurement data $D_0$ (123) in FIG. 17B, since there is no distance measurement data to serve as a reference in the memory, the distance measurement data corresponding to the absolute or relative distance is stored. The differential distance data $d_i$ (i=1, 2 ..., N) is expressed as the difference of the distance measurement data $D_i$ and $D_{i-1}$, i.e. ($D_i-D_{i-1}$). Note that N is the total number of the distance measurement data.

In the above example, the difference from the adjacent data was stored in the distance data file, however the differential distance data may also be a differential distance from a certain reference distance measurement data. For example, the differential distance measurement data $d_i$ (i=1, 2, ..., N) may be given as the difference between $D_i$ and $D_0$ with denoting $D_0$ as the reference distance measurement data.

As explained above, according to the fourth embodiment, in the same way as the third embodiment, the number of bits or bytes required by the distance measurement data can be reduced, so the storage space of the file is reduced.

Next, an explanation will be given of a fifth embodiment with reference to FIG. 18A and FIG. 18B. The flowchart of the fifth embodiment partly differs from the flowchart shown in FIG. 11A and FIG. 11B of the first embodiment. The rest of the portions are similar to those of the first embodiment and the three-dimensional image data output in the 3D mode may be of any of the data formats used in the first to fourth embodiments.

When it is confirmed at step 201 that the release switch 15 has been completely depressed, the routine proceeds to step 202 at which it is determined which of the modes V, D or 3D is set. When the mode is the V mode or 3D mode, the distance measuring light beam control turned OFF and the video control of the CCD 28 is turned ON at steps 225 and 226, respectively.

At step 227, it is determined whether an image has been photographed. When an image has been photographed, the captured image data is temporarily stored in the image memory 34. At step 228, it is determined whether the mode is set to the 3D mode. If the mode is set to the 3D mode, the routine proceeds to step 203, where a distance information sensing operation identical to that of the first embodiment is performed. Namely, the process performed in step 203 to step 223 is the same as the process performed in step 103 to step 123 in the first embodiment.

When the calculation of the distance measurement data is completed at step 223, the distance measurement data is temporarily stored in the image memory 34. Then, the image data and distance measurement data stored in the image memory 34 are stored, at step 224, as a three-dimensional image information file in the recording medium M in any of the data formats explained in the first to fourth embodiments.

When it is determined at step 228 that the mode is not the 3D mode, the routine proceeds to step 224 at which the image data temporarily stored in the image memory 34, is stored in the recording medium M as an image data file.

Further, when it is determined at step 202 that the 3D mode is not set and the V/D mode switch 18 is set to the D mode, the routine directly proceeds to step 203. The distance=information sensing operation is performed from step 203 to step 223. At step 224, the distance measurement data that was detected in the operation is temporarily stored in the image memory 34, then is stored in a distance data file which was created in the recording medium M.

As explained above, according to the fifth embodiment, the image information sensing operation and distance information sensing operation in the 3D mode can be performed as a series of processings.

An explanation of a sixth embodiment of the present invention will be given with reference to FIG. 19A to FIG. 22B.

The sixth embodiment is substantially the same in configuration as the fifth embodiment, but differs in the method of storing the image data and distance measurement data in the recording medium. In the first to fifth embodiments, the image data and the distance measurement data were stored in a single three-dimensional image information file, but in the sixth embodiment, the image data and distance measurement data are individually stored in an image data file and a distance data file.

Figure 19A:
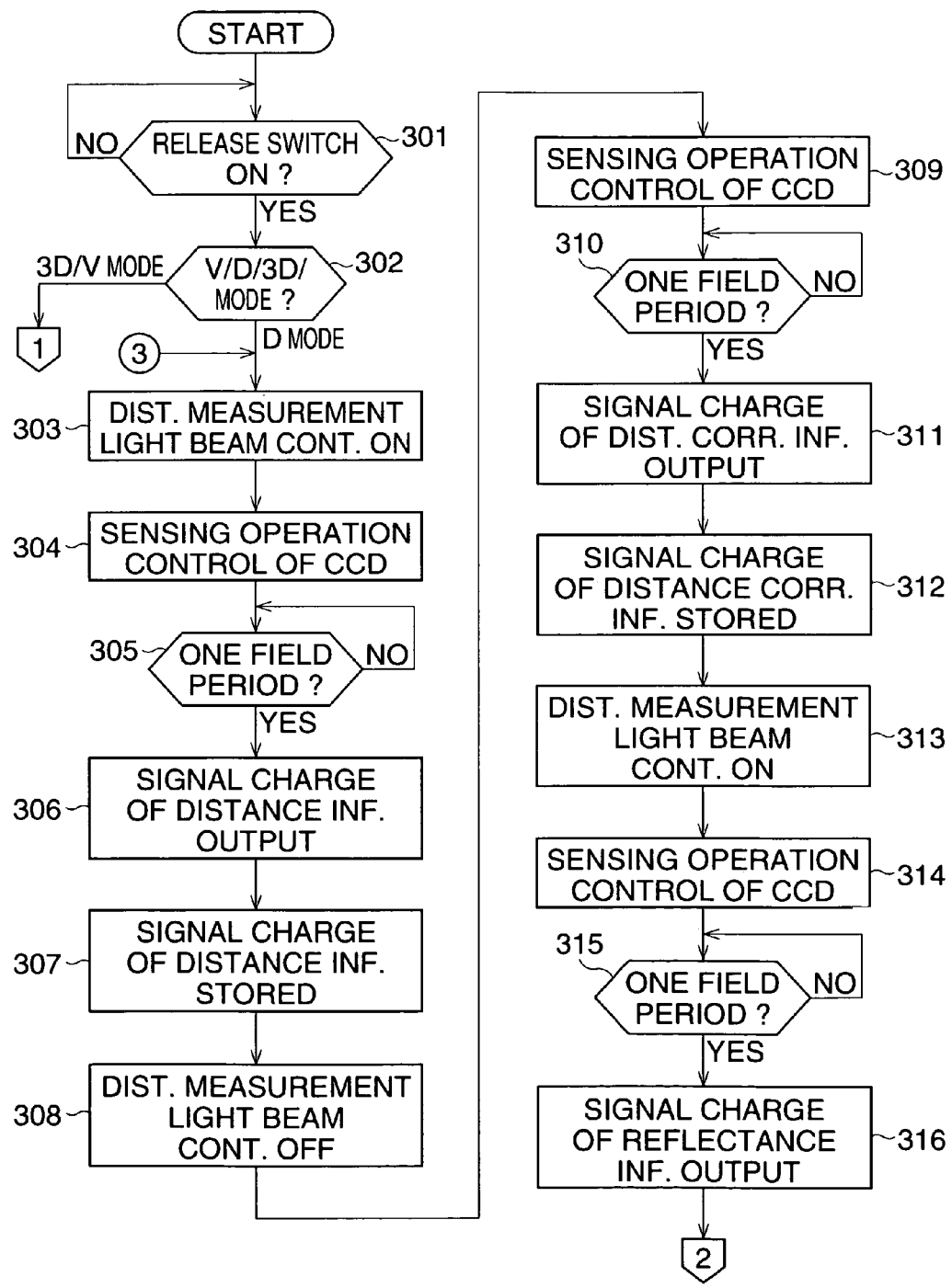

FIG. 19A and FIG. 19B are a flowchart of the sixth embodiment. The flowchart shown in FIG. 19A and FIG.

Figure 18A:
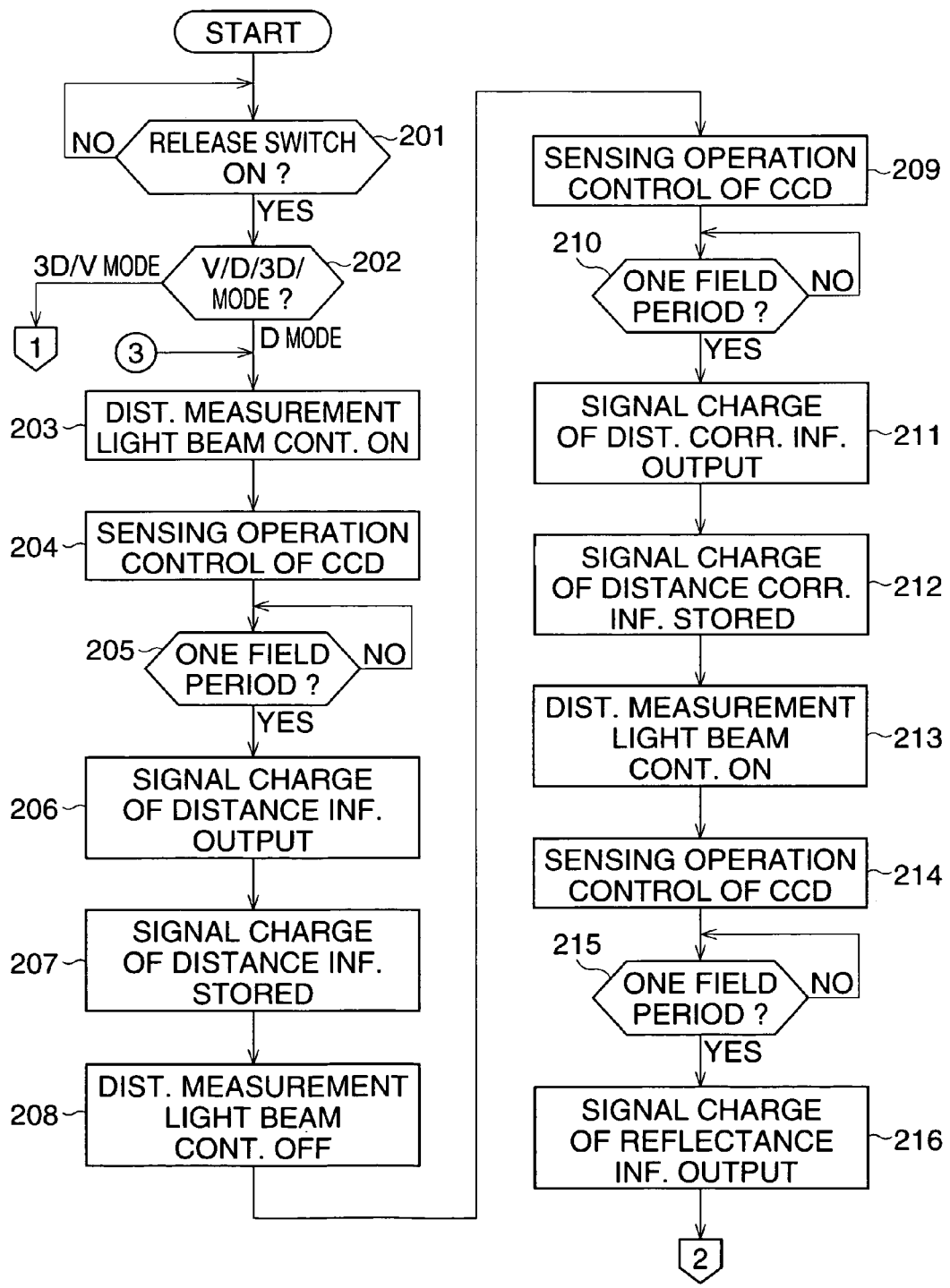
FIG. 18A and FIG. 18B show a flowchart of a distance information sensing operation and image information sensing operation in a fifth embodiment.
Figure 18B:
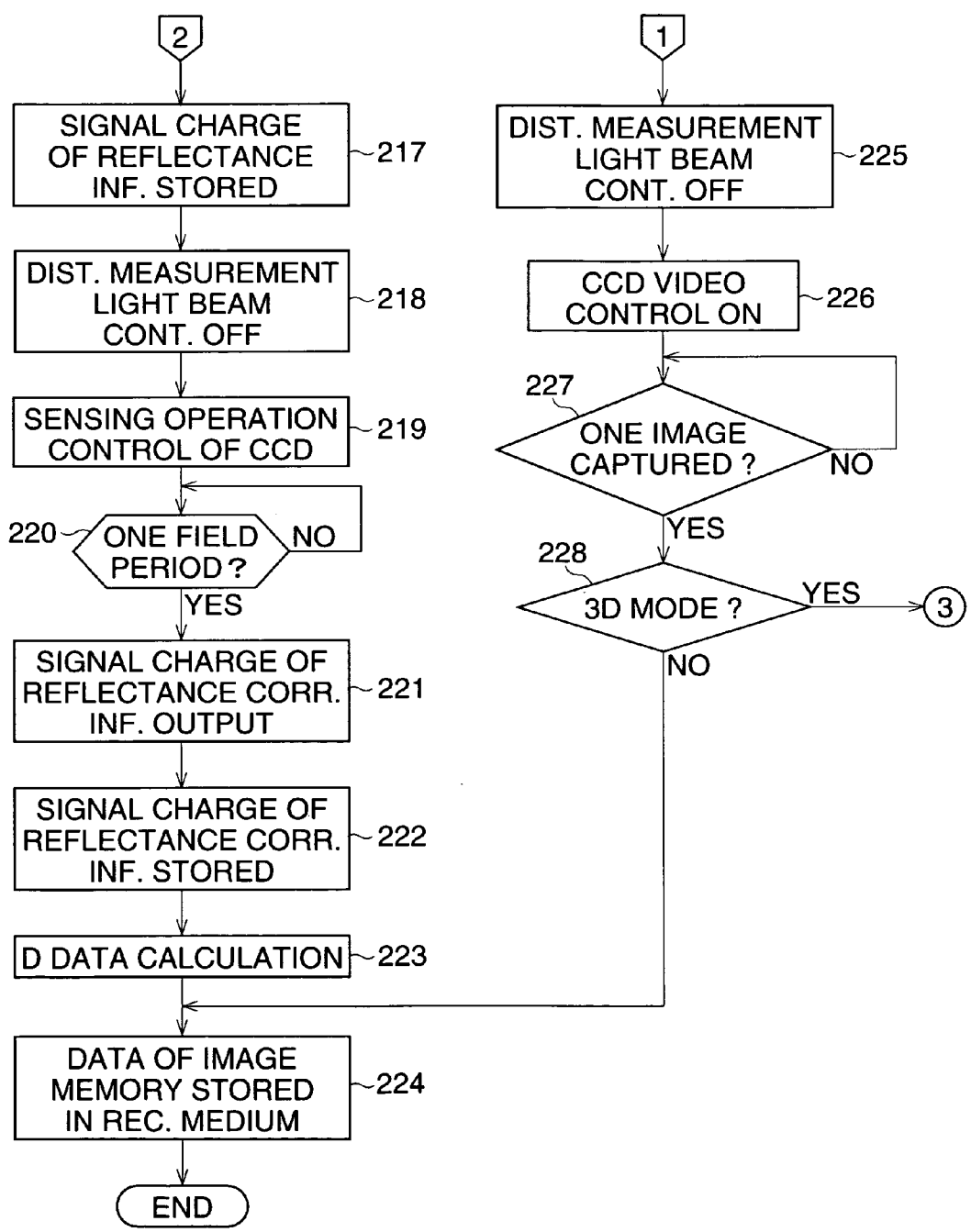

19B differs somewhat from the flowchart of the fifth embodiment in the portion for storing the image data and distance measurement data in the recording medium, but the rest of the portions are similar to those of the flowchart shown in FIG. 18A and FIG. 18B. Namely, step 301 to step 323 correspond to step 201 to step 223, while step 325 to step 327 correspond to step 225 to 227. In the fifth embodiment, the image data and distance measurement data are stored together as a single file at step 224. In the sixth embodiment, however, the distance measurement data is stored in the recording medium M as a distance data file at step 324, while the image data is stored in the recording medium M as an image data file at step 328. When the image data is stored in the image data file at step 328, similar processing to that of step 228 is performed at step 329. Namely, it is determined if the 3D mode has been set. The program of the sixth embodiment ends after the distance measurement data is stored in the distance data file at step 324 or when it is determined at step 329 that the 3D mode has not been set.

In the sixth embodiment, when the 3D mode has not been set and the V/D mode switch 18 has been set to the V mode, only the image information is detected and stored as image data in the image data file. When the 3D mode has not been set and the V/D mode switch 18 has been set to the D mode, only the distance information is detected and stored as distance measurement data in the distance data file. On the other hand, when the 3D mode has been set, the image information and distance information are successively detected and the image data and distance measurement data are stored as pairs of data in the image data file and distance data file.

With reference to FIG. 12A, FIG. 12B, FIG. 20, FIG. 21A and FIG. 21B, an explanation of the method of storage of the data at step 324 and step 328 will be given.

As explained above, when the 3D mode switch 61 is not set to the 3D mode (FIG. 12A), the distance measurement data stored in the image memory 34 at step 324 and the image data stored in the image memory 34 at step 328 are respectively stored in a distance data file and image data file which are created as irrelevant files in the recording medium M. Namely, the image data obtained in the V mode and the distance measurement data obtained in the D mode are treated as unrelated data. On the other hand, when the 3D mode switch 61 is set to the 3D mode (FIG. 12B), the distance measurement data stored at step 324 and the image data stored at step 328 are treated as related pairs of data. Namely, the distance data file stores file link information for identifying the corresponding image data file from other files, while the data file stores file link information for identifying the corresponding distance data file. Thus, the image data file and the distance data file can identify each other by referring to the file link information that is stored in the file management area of the files, and it is possible to obtain the corresponding image data and distance measurement data for each pixel required for three-dimensional image processing.

Figure 20:
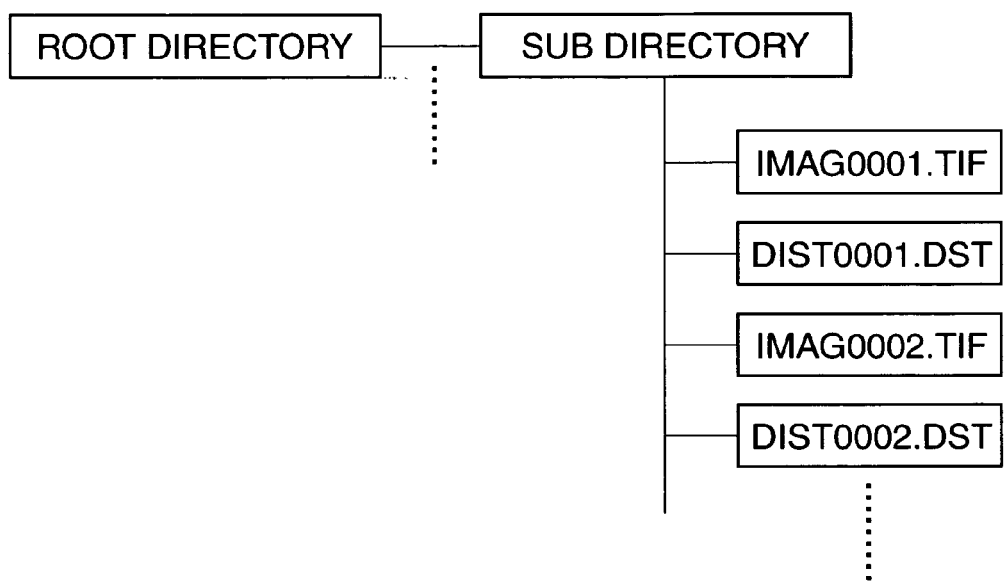
FIG. 20 is a view of the relation between an image data file and a distance data file in the sixth embodiment.

FIG. 20 shows an example of an image data-file and distance data file created in the three-dimensional image capturing mode (3D mode). For example, when the mode is set to the three-dimensional image capturing mode, the image data is stored in the image data file "IMAG0001.TIF" (TIFF file) at step 328, and the distance measurement data is stored in the distance data file "DIST0001.DST" at step 324. The image data file "IMA0001.TIF" stores, as file link information, the fact that the end of the file name of the corresponding distance data file except for the file extension is the same "0001" as the image data file and that the file extension is "DST". Similarly, the distance data file "DIST0001.DST" stores, as file link information, the fact that the end of the file name of the corresponding image data file except for the file extension is "0001" and that the file extension is "TIF".

At step 324 and step 328, the names of the files prepared when storing the distance measurement data and image data are automatically assigned after investigating the file names of the distance data files and image data files already present in the recording medium. Namely, in the three-dimensional image capturing mode, the file names of both of the existing distance data files and image data files are investigated, the one with the largest end number of the file name in these two types of files is selected, and new names are assigned to the distance data file and image data file by using the above selected file end number plus 1 as common end numbers of the files. Further, when the three-dimensional image capturing mode has not been set, at step 324, a new file name is assigned by adding 1 to the end of the file name of the existing distance data file with the largest end number and, at step 328, a new file name is assigned by adding 1 to the end of the file name of the existing image data file with the largest end number.

Figure 21A:
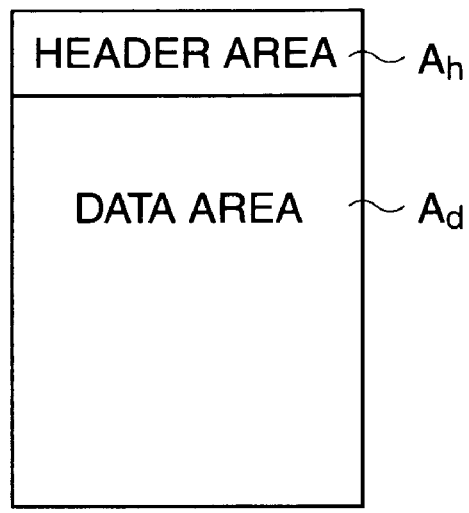
FIG. 21A is a view of the general structure of an image data file in the sixth embodiment.
Figure 21B:
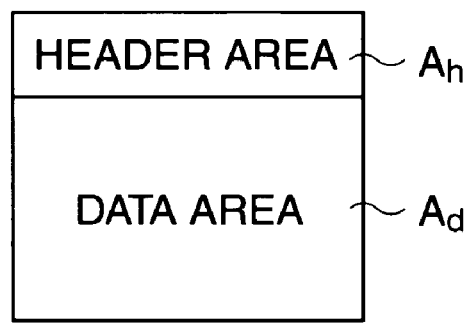
FIG. 21B is a view of the general structure of a distance data file in the sixth embodiment.

FIG. 21A and FIG. 21B schematically show the structures of an image data file and distance data file. These files, like the three-dimensional image information files explained with reference to FIG. 13, are roughly divided into file management areas (header areas) $A_h$ and data areas $A_d$. The header area $A_h$ of the image data file, for example, stores the following information; the fact that the image data is luminance information relating to red (R), green (G), and blue (B), or the order in which RGB data is stored, the number of data bits or bytes, and other information relating to the image data; the date on which the photograph was taken, the photographer's name, the photographic conditions, and other information relating to the photograph; the above file link information; and etc. The header area $A_h$ of the distance data file stores the unit of distance in the distance measurement data, the format of the data, the number of data bits or bytes, and other information relating to the distance measurement data, the above file link information, and etc.

Figure 22A:
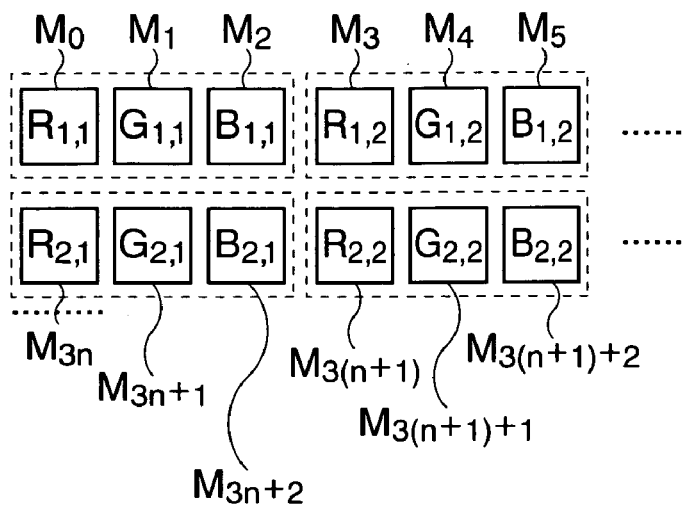
FIG. 22A is a view of the general structure of the image data stored in the image data file in the sixth embodiment.

The RGB image data corresponding to each pixel is stored in the data area $A_d$ of the image data file at step 328 (FIG. 19B). FIG. 22A schematically shows the memory arrangement of the image data stored in the data area $A_d$. In the figure, the arrangement of the data is shown corresponding to the physical arrangement of the pixels, so the arrangement of the image data is shown two-dimensionally. Namely, $M_0$, $M_1$, and $M_2$ store the image data (pixel values) $R_{1,1}$, $G_{1,1}$, and $B_{1,1}$ relating to the RGB in the leftmost pixel of the first line. Similarly, $M_3$ to $M_5$ store the image data $R_{1,2}$, $G_{1,2}$, and $B_{1,2}$ for the second pixel from the left of the first line. $M_{3n}$ to $M_{3n+2}$ store the image data $R_{2,1}$, $G_{2,1}$, and $B_{2,1}$ for the leftmost pixel of the second line. Note that n is the number of pixels in the horizontal direction.

Figure 22B:
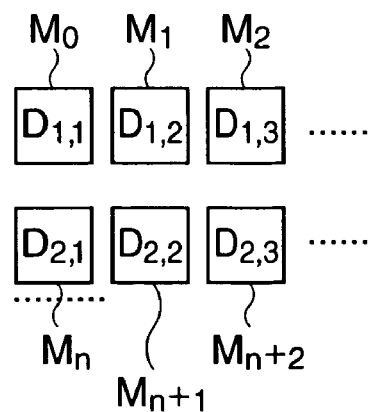
FIG. 22B is a view of the general structure of the distance measurement data stored in the distance data file in the sixth embodiment.

The distance measurement data corresponding to each pixel is stored to the data area $A_d$ of the distance data file at step 324. FIG. 22B schematically shows the memory arrangement of the distance measurement data in the data area $A_d$. Like the image data described in FIG. 22A, the memory arrangement of the data in the memory is shown corresponding to the physical arrangement of the pixels, so the arrangement of the distance measurement data is shown two-dimensionally. Namely, $D_{i,j}$ (i,j=1, 2, ...) is the distance measurement data corresponding to the j-th pixel from the left of the i-th line of the CCD 28.

As explained above, in the sixth embodiment as well, it is possible to store high precision three-dimensional image information without use of a large storage space. Further, the arrangement of the distance measurement data stored in the distance data file directly corresponds to the physical arrangement of the pixels, so the distance to each portion of the object can be quickly and easily obtained and three-dimensional image processing using the distance measurement data can be easily performed.

Note that in the sixth embodiment, the image data file and distance data file both store file link information, but it is also possible to store file link information in only one file (for example, the image data file). In the sixth embodiment, part of the file name including a file extension was used as the file link information for identifying a related file, while part of the file name with directory information may also be used as the file link information.

Figure 23A:
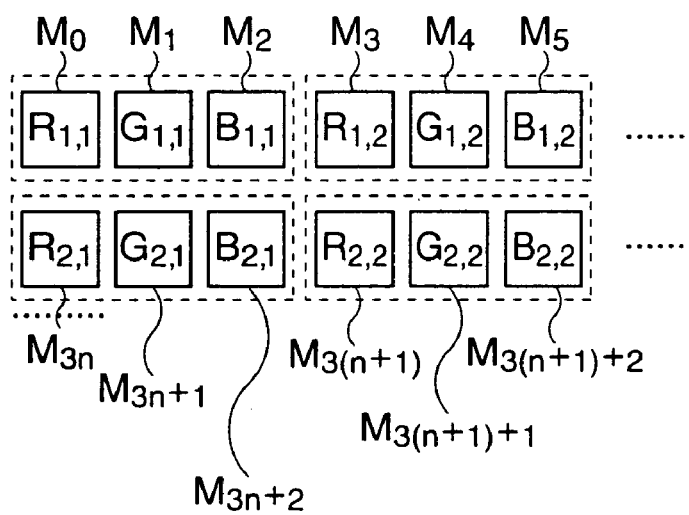
FIG. 23A is a view of the general structure of the image data stored in the image data file in a seventh embodiment.
Figure 23B:
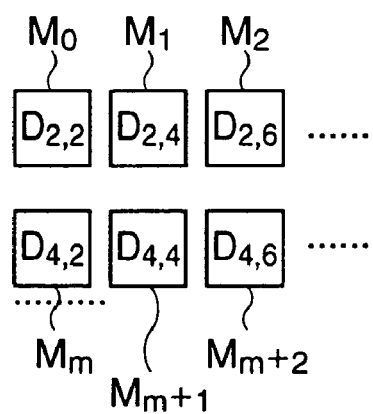
FIG. 23B is a view of the general structure of the distance measurement data stored in the distance data file in a seventh embodiment.

Next, an explanation will be given of a seventh embodiment of the present invention with reference to FIG. 23A and FIG. 23B. The configuration of the seventh embodiment is substantially the same as the configuration of the sixth embodiment. The only difference is the data format of the distance data file.

In the sixth embodiment, the RGB image data and distance measurement data were stored for each pixel. In the seventh embodiment, however, like in the second embodiment, the pixels are grouped together, for example, into groups of 4 pixels and distance measurement data is stored for each group. FIG. 23A and FIG. 23B schematically show the arrangement of the data in the memory when the data are grouped together in four pixels, namely, two in the horizontal direction and two in the vertical direction. FIG. 23A relates to the RGB image data and is exactly the same as in the sixth embodiment. FIG. 23B relates to the distance measurement data and only the distance measurement data corresponding to the bottom right pixel in a grouped pixels is stored. Here, the suffix m is an integer part of a fraction n/2, where n is the number of pixels in the horizontal direction.

As explained above, according to the seventh embodiment, when distance measurement data is not required to be as detailed as the image data, distance measurement data may be stored for every several pixels. Therefore, it can reduce the size of the distance data file from that of the sixth embodiment.

In the seventh embodiment, what is stored as the distance information of each group is the distance measurement data corresponding to the bottom right pixel in the group of four pixels. However, it may also be the distance measurement data corresponding to another pixel in the group or may be a mean value of the distance measurement data in the group.

Next, an explanation will be given of an eighth embodiment. The eighth embodiment, like the seventh embodiment, differs from the sixth embodiment only in the format of the distance data file. The rest of the configuration is similar to that of the sixth embodiment.

In the eighth embodiment, the distance measurement data stored in the distance data file, like with the third embodiment explained with reference to FIG. 16, is expressed as a relative distance of a predetermined distance range. For example, when the distance to a subject corresponding to a certain pixel is L, the distance L is expressed as the sum of the minimum distance $L_1$ of the distance range 2 and the relative distance $L_r$ from $L_1$, and the distance measurement data D ($D_{min} \leq D \leq D_{max}$) corresponding to the relative distance $L_r$ is stored in the data area of the distance data file. That is, when the distance measurement data D is, for example, 8-bit data, $D_{min}=0$, $D_{max}=255$, and $L_r$ is expressed by $L_r = D \cdot (L_2 - L_1)/256$.

The header area of the distance data file stores, in addition to the information illustrated in the sixth embodiment, the information of the minimum distance and maximum distance of the distance ranges and information showing which distance range each pixel corresponds to. As explained in the third embodiment, when storing distance measurement data, the adjacent pixel ordinarily corresponds to the same distance range, so the correspondence between pixels and the distance range does not have to be stored for each pixel. For example, when pixels continuing along the horizontal direction over a certain length correspond to the same distance range, the data address at which the length starts or ends and the distance range in that length are the only information to be stored.

As explained above, according to the eighth embodiment, by expressing the distance to a subject by a relative distance in a distance range, it is possible to reduce the number of bits assigned for one distance measurement data. Therefore it can reduce the size of the distance data file.

Next, an explanation will be given of a ninth embodiment. The configuration of the ninth embodiment is substantially the same as the configuration of the eighth embodiment, but the distance measurement data, like in the fourth embodiment, is expressed as a difference from a reference distance measurement data. That is, in the ninth embodiment, the distance measurement data in FIG. 17A, as explained in the fourth embodiment, is expressed in the form of a difference referenced from adjacent distance measurement data in a predetermined direction of the memory, preferably described in FIG. 17B.

As explained above, according to the ninth embodiment, in the same way as the eighth embodiment, the number of bits required by the distance measurement data can be reduced, so the size of the distance file can be reduced.

Note that in the above embodiments, only one area sensor (CCD) was provided, so the image information and distance information could not be obtained simultaneously, but it is also possible to split the light incident from the camera lens 11 into two using a half mirror etc. and have the split light received at two area sensors so as to simultaneously detect the image information and distance information.

Further, in the above embodiments, the image data was composed of RGB data, but it is also possible to use YCbCr data. Also, it is possible to use monochrome image data instead of color image data. Further, the digital data may be converted to an analog signal for storage in an analog recording medium.

In the first embodiment, all of the image data was stored in the recording medium M, then the distance measurement data was stored in the recording medium M, so the recording medium M had to be able to be randomly accessed. By storing the image data and distance measurement data once in a memory provided inside or outside of the system control circuit 35 for example, it is also possible to output the data sequentially to the recording medium M in accordance with the format of the three-dimensional image information file. Further, the digital data may be converted to an analog signal for storage in an analog recording medium.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application Nos. 11-141650 and 11-151366 (filed on May 21, 1999 and May 31, 1999 respectively) which are expressly incorporated herein, by reference, in their entireties.

The invention claimed is:

1. A three-dimensional image capturing device comprising:
   an image capturing processor that obtains image data of a subject;
   a distance measurement data detecting processor that detects distances, from said device to points on a surface of said subject, corresponding to at least one of said image data to obtain distance measurement data; and
   a three-dimensional image data storing processor that stores said image data and said distance measurement data in a recording medium so that said image data and said distance measurement data are associated with each other;
   wherein said three-dimensional image data storing processor stores said image data as a plurality of sub-areas of the subject and said distance measurement data for each sub-area in said recording medium as a single file so as to maintain the association between said image data of each sub-area and said distance measurement data; and
   wherein said image data of each sub-area and each of said associated distance measurement data are stored adjacently in said recording medium.

2. A device according to claim 1, wherein said image data of each sub-area is associated with one of said distance measurement data.

3. A device according to claim 1, wherein said file comprises a file management area for storing common information of said file and a data area for storing data.

4. A device according to claim 3, wherein said distance measurement data represents absolute distances from said device to said points in a predetermined unit of distance.

5. A device according to claim 4, wherein said unit of distance is stored in said file management area.

6. A device according to claim 3, wherein said distance measurement data represents relative distances in a predetermined distance range, and distance range information relating to said distance range is stored in said file management area.

7. A device according to claim 6, wherein said distance range information comprises a minimum distance and a maximum distance of said distance range or said minimum distance and a length of said distance range.

8. A device according to claim 1, wherein said stored distance measurement data represents differences from a predetermined distance that corresponds to reference distance measurement data which is one of said stored distance measurement data.

9. A device according to claim 8, wherein said reference distance measurement data is with reference to distance measurement data that is adjacent, in a predetermined direction, and, when there is no adjacent distance measurement data to refer to, the distance measurement data represents an absolute distance from said device to said point or a relative data in a predetermined distance range.

10. A three-dimensional image capturing device comprising:
    an image capturing processor that obtains image data of a subject;
    a distance measurement data detecting processor that detects distances, from said device to points on a surface of said subject, corresponding to at least one of said image data to obtain distance measurement data; and
    a three-dimensional image data storing processor that stores said image data as a plurality of sub-areas of said subject and said distance measurement data for each sub-area in a recording medium so that said image data of each sub-area and said distance measurement data for each sub-area are associated with each other;
    wherein said distance measurement data represents relative distances in a predetermined distance range, and distance range information relating to said distance range is stored in a file management area.

11. A device according to claim 10, wherein said three-dimensional image data storing processor stores said image data for each sub-area and said distance measurement data in said recording medium as a single file so as to maintain the association between said image data and said distance measurement data.

12. A device according to claim 11, wherein said image data of each sub-area is associated with one of said distance measurement data.

13. A device according to claim 11, wherein said image data of each sub-area and each of said associated distance measurement data are stored adjacently in said recording medium.

14. A device according to claim 11, wherein each said file comprises a file management area for storing common information of said file and a data area for storing data.

15. A device according to claim 10, wherein said distance range information comprises a minimum distance and a maximum distance of said distance range or said minimum distance and a length of said distance range.

16. A device according to claim 10, wherein said three-dimensional image data storing processor stores said image data and said distance measurement data in an image data file and distance data file, respectively, and stores file link information that expresses mutual linkage information of said image data file and said distance data file so as to maintain the association between said image data and said distance measurement data.

17. A device according to claim 16, wherein said image data, said distance measurement data, and said file link information are stored in a single said recording medium.

18. A device according to claim 16, wherein said image data file comprises a first file management area for storing common information of said image data file and a first data area for storing image data, and said distance data file comprises a second file management area for storing common information of said distance data file and a second data area for storing said distance measurement data.

19. A device according to claim 18, wherein said file link information is stored in at least one of said first or second file management areas.

20. A device according to claim 19, wherein said first file management area stores information for identifying the associated distance data file as said file link information, and said second file management area stores information for identifying the corresponding image data file as said file link information.

21. A device according to claim 20, wherein each of said file link information stored in said first and second file management area comprises common information so as to indicate the mutual linkage.

22. A device according to claim 21, wherein said common information is part of a file name including a file extension.

23. A device according to claim 16, wherein said distance range information comprises a minimum distance and a maximum distance of said distance range or said minimum distance and a length of said distance range.

24. A three-dimensional image capturing device comprising:

an image capturing processor that obtains image data of a subject;

a distance measurement data detecting processor that detects distances, from said device to points on a surface of said subject, corresponding to at least one of said image data to obtain distance measurement data; and a three-dimensional image data storing processor that stores said image data and said distance measurement data in a recording medium so that said image data and said distance measurement data are associated with each other;

wherein said stored distance measurement data represents differences from a predetermined distance that corresponds to reference distance measurement data which is one of said stored distance measurement data.

25. A device according to claim 24, wherein said reference distance measurement data is with reference to distance measurement data that is adjacent, in a predetermined direction, and, when there is no adjacent distance measurement data to refer to, the distance measurement data represents an absolute distance from said device to said point or a relative data in a predetermined distance range.

* * * * *